(12) United States Patent
Elzanaty et al.

(10) Patent No.: US 11,394,467 B2
(45) Date of Patent: Jul. 19, 2022

(54) COMMUNICATING OVER A FREE-SPACE OPTICAL CHANNEL USING DISTRIBUTION MATCHING

(71) Applicant: KING ABDULLAH UNIVERSITY OF SCIENCE AND TECHNOLOGY, Thuwal (SA)

(72) Inventors: Ahmed Mohamed Elzanaty, Thuwal (SA); Mohamed-Slim Alouini, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/357,450

(22) Filed: Jun. 24, 2021

(65) Prior Publication Data

US 2022/0006532 A1 Jan. 6, 2022

Related U.S. Application Data

(60) Provisional application No. 63/044,044, filed on Jun. 25, 2020.

(51) Int. Cl.
*H04B 10/524* (2013.01)
*H04B 10/40* (2013.01)
(Continued)

(52) U.S. Cl.
CPC ......... *H04B 10/524* (2013.01); *H04B 10/11* (2013.01); *H04B 10/40* (2013.01); *H04B 10/503* (2013.01)

(58) Field of Classification Search
CPC ...... H04B 10/524; H04B 10/11; H04B 10/40; H04B 10/503
(Continued)

(56) References Cited

U.S. PATENT DOCUMENTS 11,012,187 B1 * 5/2021 Kim ..................... H04L 1/0047
2018/0367246 A1 * 12/2018 Kakande ................ G06N 7/005
(Continued)

OTHER PUBLICATIONS

Al-Habash, M.A., et al., "Mathematical Model for the Irradiance Probability Density Function of a Laser Beam Propagating Through Turbulent Media," Optical Engineering, Aug. 2001, vol. 40, No. 8, pp. 1554-1562.
(Continued)

*Primary Examiner* — Dalzid E Singh
(74) *Attorney, Agent, or Firm* — Patent Portfolio Builders PLLC

(57) ABSTRACT

A method for optical communication between first and second transceivers over a channel in a free-space medium involves receiving a binary string of uniformly distributed bits and converting them into probabilistically-shaped unipolar M-pulse amplitude modulated (M-PAM) symbols using distribution matching. The probabilistically-shaped unipolar M-PAM symbols are mapped into a binary bit stream, which are used to generate, at a forward error correction rate, parity bits. The parity bits are mapped to uniformly-distributed unipolar M-PAM parity symbols. The probabilistically-shaped unipolar M-PAM symbols and the uniformly-distributed unipolar M-PAM parity symbols are multiplexed to form a codeword that is used to modulate the intensity of a laser so as to transmit the codeword.

20 Claims, 13 Drawing Sheets

(51) Int. Cl.
  *H04B 10/50* (2013.01)
  *H04B 10/11* (2013.01)
(58) Field of Classification Search
  USPC .......................................................... 398/128
  See application file for complete search history.

(56) References Cited

U.S. PATENT DOCUMENTS

| | | | |
|---|---|---|---|
| 2020/0044770 A1* | 2/2020 | Lefevre | H04L 27/0002 |
| 2020/0119840 A1* | 4/2020 | Ebrahimzad | H04L 27/34 |
| 2020/0280468 A1* | 9/2020 | Cho | H04B 10/516 |
| 2020/0313773 A1* | 10/2020 | Torbatian | H04L 1/0041 |
| 2021/0119708 A1* | 4/2021 | Yue | H04B 10/07953 |
| 2021/0218496 A1* | 7/2021 | Koganei | H04L 1/0015 |

OTHER PUBLICATIONS

Böcherer, G., et al., "Bandwidth Efficient and Rate-Matched Low-Density Parity-Check Coded Modulation," IEEE Transactions on Communications, Dec. 2015, vol. 63, No. 12, pp. 4651-4665, IEEE.

Chaaban, A., et al., "Free-Space Optical Communications: Capacity Bounds, Approximations, and a New Sphere-Packing Perspective," IEEE Transactions on Communications, Mar. 2016, vol. 64, No. 3, pp. 1176-1191, IEEE.

Cho, J., et al., "Probabilistic Constellation Shaping for Optical Fiber Communications," Journal of Lightwave Technology, Mar. 15, 2019, vol. 37, No. 6, pp. 1590-1607, IEEE.

Farid, A.A., et al., "Capacity Bounds for Wireless Optical Intensity Channels with Gaussian Noise," IEEE Transactions on Information Theory, Dec. 2010, vol. 56, No. 12, pp. 6066-6077, IEEE.

Farid, A.A., et al., "Channel Capacity and Non-Uniform Signalling for Free-Space Optical Intensity Channels," IEEE Journal on Selected Areas in Communications, Dec. 2009, vol. 27, No. 9, pp. 1553-1563, IEEE.

He, Z., et al., "Probabilistically Shaped Coded Modulation for IM/DD System," Optics Express, Apr. 29, 2019, vol. 27, No. 9, pp. 12 126-12 136.

Lapidoth, A., et al., "On the Capacity of Free-Space Optical Intensity Channels," IEEE Transactions on Information Theory, Oct. 2009, vol. 55, No. 10, pp. 4449-4461, IEEE.

Lipp, T., et al., "Variations and Extension of the Convex-Concave Procedure," Optimization and Engineering, Jun. 2016, vol. 17, No. 2, pp. 263-287, Springer.

Nistazakis, H.E., et al., "Performance Analysis of Free-Space Optical Communication Systems Over Atmospheric Turbulence Channels," IET Communications, Aug. 2009, vol. 3, No. 8, pp. 1402-1409.

Schulte, P., et al., "Constant Composition Distribution Matching," IEEE Transactions on Information Theory, Jan. 2016, vol. 62, No. 1, pp. 430-434, IEEE.

* cited by examiner

COMMUNICATING OVER A FREE-SPACE OPTICAL CHANNEL USING DISTRIBUTION MATCHING

CROSS-REFERENCE TO RELATED APPLICATIONS

This application claims priority to U.S. Provisional Patent Application No. 63/044,044, filed on Jun. 25, 2020, entitled "ADAPTIVE CODED MODULATION FOR FREE-SPACE OPTICAL BACKHAULING," the disclosure of which is incorporated herein by reference in its entirety.

BACKGROUND

Technical Field

Embodiments of the disclosed subject matter generally relate to systems and methods for communicating over a free-space optical channel with intensity modulation/direct detection (IM/DD) using probabilistic shaping to generate probabilistically shaped unipolar M-ary pulse amplitude modulation (M-PAM) symbols, approaching the channel capacity.

Discussion of the Background

Efforts to increase available data rates in cellular networks are starting to focus on dense placement of small cells. Each cell requires a backhaul communication link to communicate information between the cell and the core cellular network. Backhaul communication links have conventionally been implemented using fiber optical cabling, which can be quite expense for number of cells using the dense placement of small cells and thus is conventionally used for cells located in remote areas. Another option is to use electromagnetic communications in the microwave frequencies. However, these frequencies are limited resource allocated by governmental authorities and these frequencies are becoming quite congested.

Free-space optical communication techniques have recently been investigated as a lower cost method of providing long-distance, high-speed communication link. Free-space optics involves the modulation of a light source, such as a laser, and the transmission of the modulated light over to a receiver having line-of-sight with the transmitter. Free-space optical communications are subject to time-variant atmospheric turbulence, which can cause severe degradation in the performance, as the quality of the free-space optical link continuously varies with time. Therefore, any free-space optical communication technique should be able to mitigate the effects of the atmospheric turbulence and boost the performance for various channel conditions.

Free-space optical communication systems typically employ IM/DD instead of coherent modulation techniques typically used radio frequency (RF) based systems, which is due to its low cost, power consumption, and computational complexity. Due to the differences between radio frequency and optical communications, the signal constellation for free-space optical communications with IM/DD has the additional constraints that the input signal is subject to non-negative signaling and average optical power constraints.

Efficient free-space optical communications can be realized by the joint design of higher-order modulation schemes and channel coding, known in the literature as coded modulation (CM). Generally, the design of transceivers with a transmission rate close to the channel capacity has three main considerations. First, the distribution of the symbols should match the capacity-achieving distribution of the channel. Second, optimal sufficiently long channel codes are required. Third, the transmission rate should be adapted with fine granularity according to the channel condition, i.e., the encoder supports a large number of transmission modes over a wide range of signal-to-noise ratios (SNRs). The design of efficient coded modulation systems fulfilling these requirements is challenging. For example, the input distribution is not, in general, the capacity-achieving one, causing what is called the shaping gap. Additionally, finite length forward error correction (FEC) codes are implemented in practice, which results in a coding gap. Finally, the number of allowable modulation orders and coding rates to choose among are limited by the targeted system complexity, leading to partially-adaptive systems.

IM/DD has been discussed for additive white Gaussian noise (AWGN) channels with electrical power constraints using probabilistically shaped on-off keying (OOK) symbols. The spectral efficiency of this technique is low compared to higher-order modulations, and accordingly the transmission data rates are likewise limited. Further, this technique is designed to consider the average electrical power constraint for the signal, whereas free-space optical communications are subject to average optical power constraints for intensity channels. Additionally, since this technique assumes an AWGN channel, it does not capture or adapt to diverse channel conditions in free-space optical channels such as the turbulence-induced fading.

The shaping gap can be addressed by optimizing the shape of the modulated signal constellation, which can decrease the difference between the transmission rate and Shannon's limit. The main categories of constellation shaping are geometric shaping and probabilistic shaping (PS). In geometric shaping the symbols in the constellation are equiprobable and non-uniformly spaced, whereas a probabilistically shaped constellation is uniformly spaced with varying probabilities per symbol. Probabilistic shaping has attracted increased attention in the last several years, due to its higher shaping gain, rate adaptability, and the possibility of using Gray code for symbol labeling.

Probabilistic shaping has gained increased interest for fiber-optical communications, which was followed by the introduction of the probabilistic amplitude shaping (PAS) scheme to approach the capacity of fiber-optical channels. In probabilistic shaping architectures the capacity-achieving distribution should be symmetric around zero. In this case, the uniformly distributed parity bits from the FEC encoder can modulate the sign of the symbols. Therefore, probabilistic amplitude shaping is only suitable for bipolar input signals and cannot be directly extended to IM/DD in free-space optical channels due to the constellation symbols being constrained to be non-negative, i.e., unipolar signaling.

Reference Document [1] discloses using unipolar M-ary pulse amplitude modulation (M-PAM) signaling in an IM/DD system to achieve a near-capacity performance for free-space optical channels. Specifically, the input distribution is designed to maximize the source entropy, which approximates the optimal distribution at high SNRs. However, the inventors have recognized that the optimal capacity achieving distribution should maximize mutual information, instead of the source entropy. Further, the technique disclosed in Reference Document [1] uses multi-level coding (MLC) with multi-stage decoding (MSD), which requires the encoder to have multiple forward error correction encoders to generate the probabilistically shaped symbols with the desired distribution and the receiver to include a multi-stage decoder, which results in error propagation and long latency due to the successive decoding of bit levels.

Reference Document [2] employs a sub-optimal coded modulation scheme for IM/DD channels with unipolar M-PAM. Only even-indexed symbols are freely probabilistically shaped, while the probability of the odd-indexed symbols is forced to equal the probability of the preceding even symbol. Thus, the input distribution cannot be fully optimized to match the capacity-achieving distribution of the channel, leading to an increased shaping gap and a rate loss.

Thus, there is a need for an efficient and practical adaptive coded modulation scheme with fine granularity and capacity-achieving input distributions for IM/DD free-space optical channels, which address the shaping gap and rate adaptability considerations.

SUMMARY

According to an embodiment, there is a method for optical communication between first and second transceivers over a channel in a free-space medium. The first transceiver receives a binary string of uniformly distributed bits and converts the received binary string of uniformly distributed bits into probabilistically-shaped unipolar M-pulse amplitude modulated (M-PAM) symbols using distribution matching. The first transceiver maps the probabilistically-shaped unipolar M-PAM symbols into a binary bit stream and generates, at a forward error correction rate, parity bits from the binary bit stream. The first transceiver maps the parity bits to uniformly-distributed unipolar M-PAM parity symbols. The first transceiver multiplexes the probabilistically-shaped unipolar M-PAM symbols and the uniformly-distributed unipolar M-PAM parity symbols to form a codeword. The first transceiver transmits the codeword over the channel to the second transceiver by modulating an intensity of a laser with the codeword.

According to another embodiment there is a transmitter for optical communication over a channel in a free-space medium. The transmitter includes a distribution matcher, which converts a received binary string of uniformly distributed bits into probabilistically-shaped unipolar M-pulse amplitude modulated (M-PAM) symbols using distribution matching. The transmitter also includes a binary mapper coupled to an output of the distribution matcher. The binary mapper maps the probabilistically-shaped unipolar M-PAM symbols into a binary bit stream. The transmitter further includes a parity bit generator coupled to an output of the binary mapper. The parity bit generator generates parity bits from the binary bit stream at a forward error correction rate. The transmitter also includes a binary demapper coupled to an output of the parity bit generator. The binary demapper maps the parity bits to uniformly-distributed unipolar M-PAM parity symbols. The transmitter further includes a multiplexer coupled to the output of the distribution matcher and an output of the binary demapper. The multiplexer multiplexes the probabilistically-shaped unipolar M-PAM symbols and the uniformly-distributed unipolar M-PAM parity symbols to form a codeword. The transmitter further includes an optical modulator coupled to an output of the multiplexer. The optical modulator modulates an intensity of a laser a light source with the codeword.

According to a further embodiment there is a receiver that receives an optical signal modulated with the codeword from the transmitter. The receiver includes an optical demodulator that receives and demodulates the optical signal and a channel estimator that estimates the channel. The receiver further includes bit-metric decoder coupled to receive the demodulated signal from the optical demodulator and the estimate of the channel from the channel estimator. The bit-metric decoder decodes the demodulated signal using the estimate of the channel to generate a set of bits corresponding to the binary bit stream. The receiver also includes a binary demapper coupled to an output of the bit-metric decoder. The binary demapper demaps the set of bits into demapped unipolar M-PAM symbols. The receiver further includes a distribution dematcher coupled to an output of the binary demapper. The distribution dematcher distribution dematches the demapped unipolar M-PAM symbols to generate a set of received information bits.

According to yet another embodiment, there is a transmitter for optical communication over a channel in a free-space medium. The transmitter includes a memory storing programming instructions and a processor coupled to the memory. Execution of the programming instructions by the processor causes the processor to receive a binary string of uniformly distributed bits; convert the received binary string of uniformly distributed bits into probabilistically-shaped unipolar M-pulse amplitude modulated (M-PAM) symbols using distribution matching; map the probabilistically-shaped unipolar M-PAM symbols into a binary bit stream; generate parity bits from the binary bit stream at a forward error correction rate; map the parity bits to uniformly-distributed unipolar M-PAM parity symbols; multiplex the probabilistically-shaped unipolar M-PAM symbols and the uniformly-distributed unipolar M-PAM parity symbols to form a codeword; and transmit the codeword over the channel to the second transceiver by modulating an intensity of a laser with the codeword.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1A:
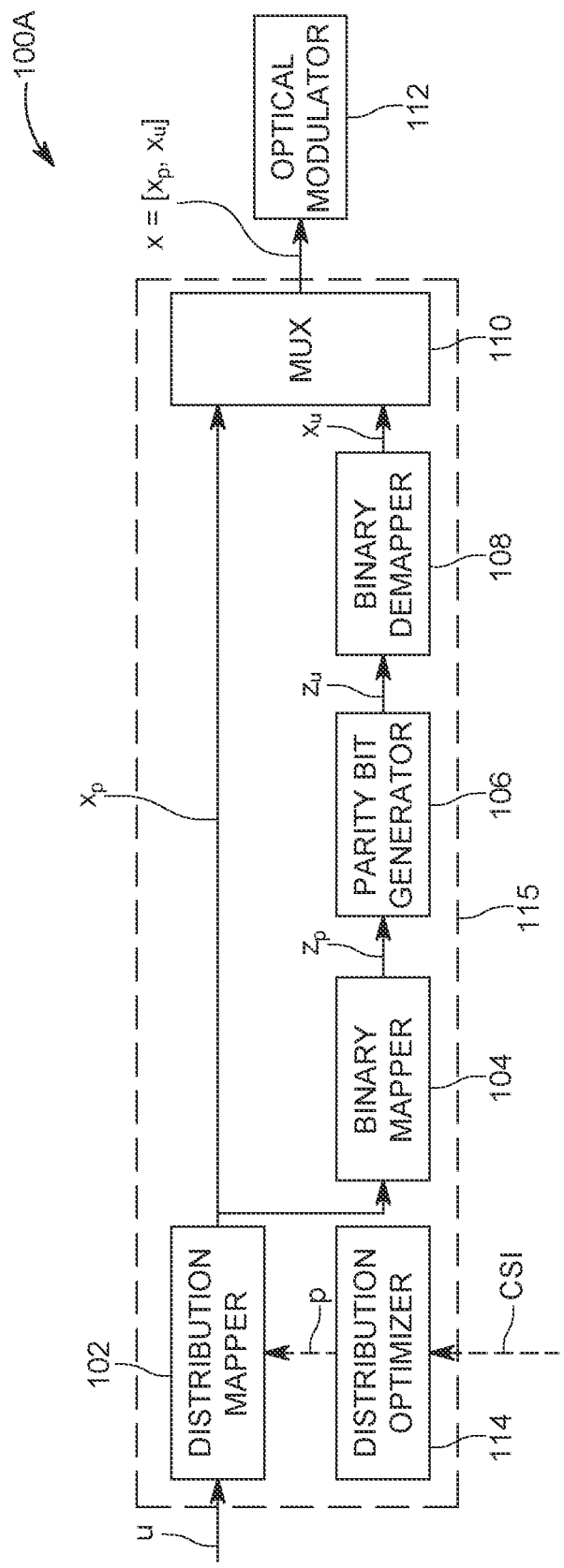
FIGS. 1A and 1B are block diagrams of a transmitter and a receiver, respectively, of a transceiver according to embodiments.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of backhaul communications over a free-space optical channel. However, it should be recognized that the disclosed embodiments are applicable for any type of free-space optical communications.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Throughout this discussion random variables (r.v.s) are denoted with capital letters and their realizations with small letters. $\mathbb{P}\{X=x\}$ denotes the probability that a discrete random variable X equals x. $\mathbb{E}\{X\}$ denotes the expected value of the random variable X. Bold letters are used for vectors, e.g., $x=[x_1, x_2, \ldots, x_n]$ and all logarithmic functions used throughout this discussion are of base 2.

The following disclosure discusses an adaptive coded modulation scheme with fine granularity to approach the capacity of IM/DD free-space optical channels through M-PAM signaling with nonnegativity and optical power constraints. Realistic models for the atmospheric turbulence are considered, i.e., Gamma-Gamma and Lognormal distributions. The disclosed encoder considers probabilistic shaping of a unipolar M-PAM constellation with a distribution matcher, followed by an efficient forward error correction encoder. The distribution matcher can implement constant composition distribution matching (CCDM) or any other matching technique that probabilistically shapes the information symbols. Therefore, the information symbols can be probabilistically shaped, while the parity check bits, generated by the forward error correction encoder, are uniformly distributed. In the decoder, the forward error correction decoding is performed before the distribution dematching (i.e., reverse concatenation architecture). The encoder can operate when the channel state information (CSI) is known at the encoder and decoder or only at the decoder.

A method for optical communication between first and second transceivers over a channel in a free-space medium will now be described in connection with the block diagrams of FIGS. 1A and 1B and the flowcharts of FIGS. 2A and 2B. It should be recognized that the transmitter 100A in FIG. 1A and the receiver 100B in FIG. 1B together form a transceiver 100. The different blocks illustrated in FIGS. 1A and 1B can be implemented as separate hardware components (e.g., processors, application specific integrated circuits (ASICs), field programmable gate arrays (FPGAs), etc.), as a single hardware component, or as a combination of hardware and software components.

Figure 2A:
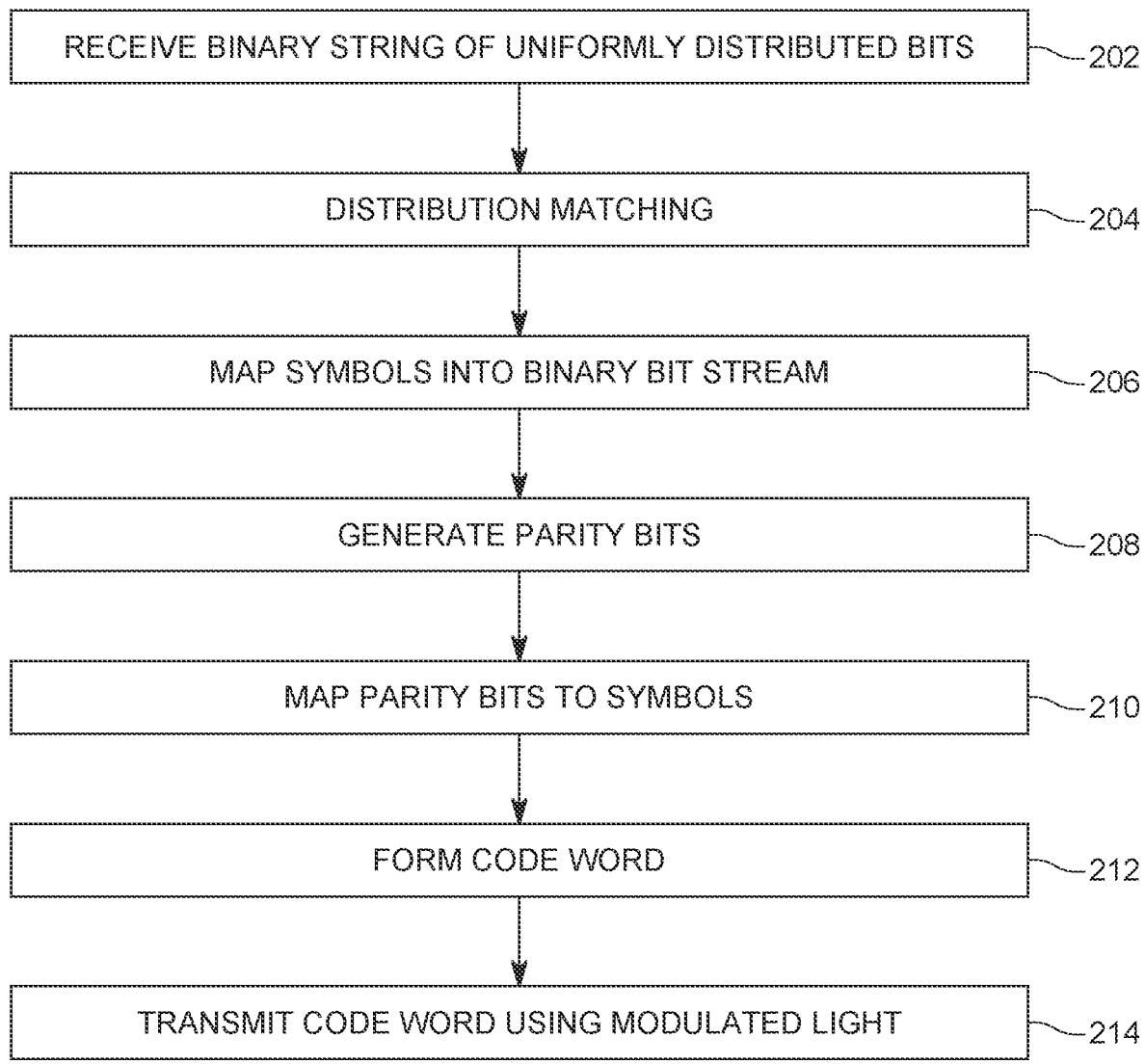
FIGS. 2A and 2B are flow diagrams of methods of transmitting and receiving, respectively, according to embodiments.
Figure 2B:
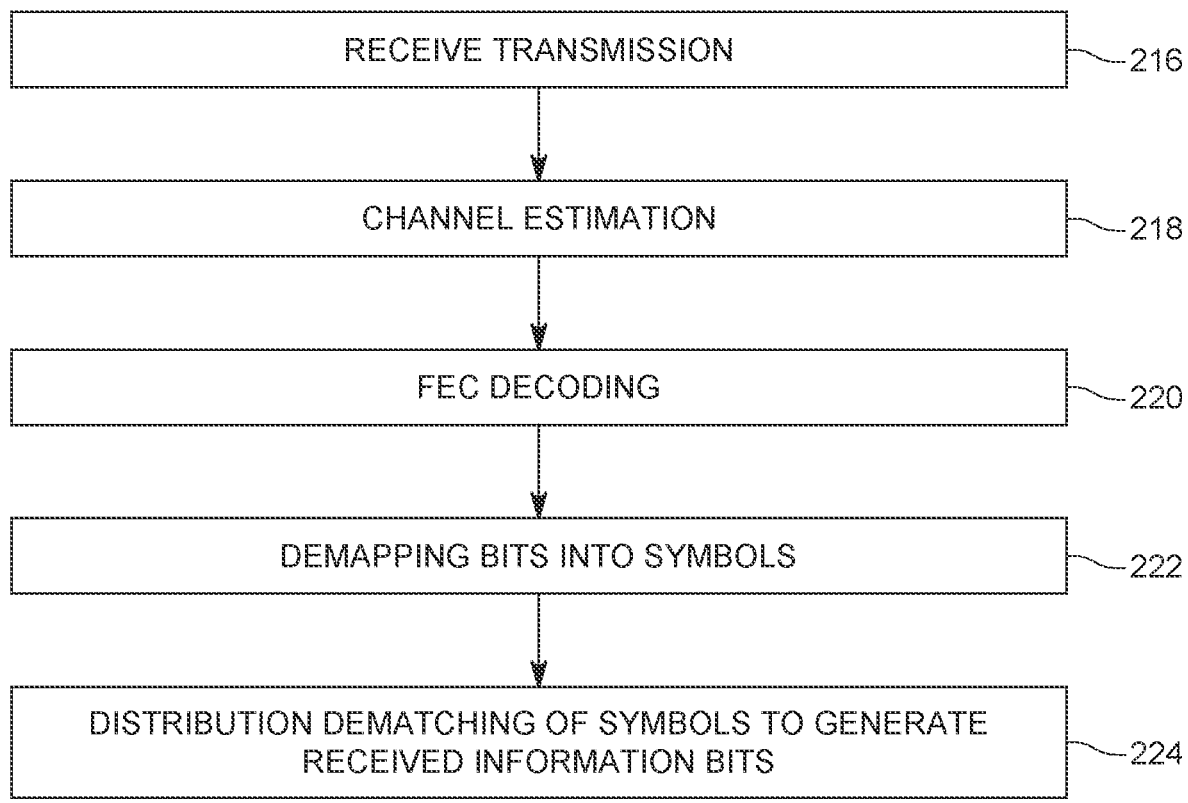

Turning first to FIGS. 1A and 2A, the first transceiver 100 receives a binary string of uniformly distributed bits u (step 202). The first transceiver 100 converts the received binary string of uniformly distributed bits u into probabilistically-shaped unipolar M-pulse amplitude modulated (M-PAM) symbols $x_p$ using distribution matching (step 204). Specifically, the distribution matcher 102 receives the string of uniformly distributed bits u and converts them into probabilistically-shaped unipolar M-PAM symbols $x_p$. In a non-limiting embodiment, the distribution matcher is a constant composition distribution matcher, additional details of which are discussed below and can be found in Reference Document [3].

The first transceiver maps the probabilistically-shaped unipolar M-PAM symbols $x_p$ into a binary bit stream $z_p$ (step 206). Specifically, the probabilistically-shaped unipolar M-PAM symbols $x_p$ are provided to binary mapper 104, which performs this mapping. The first transceiver generates parity bits $z_u$ from the binary bit stream $z_p$ (step 208). As illustrated in FIG. 1A, the parity bit generator 106, for a given forward error correction rate, generates the parity bits $z_u$. The first transceiver maps the parity bits $z_u$ to uniformly-distributed unipolar M-PAM parity symbols $x_u$ (step 210). Specifically, this is performed by binary demapper 108. The first transceiver 100 then multiplexes the probabilistically-shaped unipolar M-PAM symbols and the uniformly-distributed unipolar M-PAM parity symbols to form a codeword x (step 212). A multiplexer 110 is provided for this function. The first transceiver 100 then transmits the codeword x over the channel to the second transceiver by modulating a light source with the codeword x (step 214), which in the illustrated embodiment is performed by an optical modulator that modulates the intensity of a laser beam with the codeword x.

As illustrated in FIG. 1A, in some embodiments the distribution matcher 102 receives an optimized distribution from a distribution optimizer 114, which generates the optimized distribution based on channel state information (CSI) regarding the free-space optical channel estimated at the receiver and fed back to the transmitter. Specifically, as will be discussed in more detail below, this can involve the distribution optimizer 114 determining a capacity-achieving distribution of symbols for transmission over the channel, a data transmission rate, and the forward error correction rate so that the transceiver can convert the received binary string of uniformly distributed bits into the probabilistically-shaped unipolar M-PAM symbols using the distribution matching based on the determined capacity-achieving distribution of symbols and the data transmission rate. This determination can be based on channel state information provided by the receiving transceiver. As will be appreciated from the discussion below, in practical transceiver applications it is not possible to achieve the actual maximum capacity of the channel due to atmospheric turbulence and other noise. Accordingly, as discussed below, the term "capacity-achieving distribution of symbols" should be understood as the distribution permitting the highest reliable communication rate for a given signal-to-noise ratio.

As will be described below, some embodiments do not employ such feedback and thus the optimized distribution is generated based on a predetermined, fixed channel gain. In this case, the determination of the capacity-achieving distribution of symbols for transmission over the channel, the data transmission rate, and the forward error correction rate is based on a fixed channel gain.

As also illustrated in FIG. 1A, the distribution matcher 102, binary mapper 104, parity bit generator 106, binary demapper 108, multiplexer 110, and the distribution optimizer 114, together form the encoder 115. When channel state information is not available at the transmitter 100A, then the distribution optimizer 114 does not operate based on channel state information but instead, as detailed below in connection with equation (40), the distribution optimizer 114 determines an irradiance such that the outage probability is limited below a particular threshold. It should be recognized that the transmitter 100A can include additional components, including filters, power amplifiers, and other conventional components employed by optical transmitters.

The reception of a signal over a free-space optical channel that was transmitted using the method of FIG. 2A will now be described in connection with FIGS. 1B and 2B. The second transceiver 100 receives and demodulates the transmission from the first transceiver 100 (step 216). Specifically, optical demodulator converts the received optical signal into a corresponding electrical signal y=[$\psi_1$, $\psi_2$, . . . , $\psi_n$]. The second transceiver also estimates the channel (step 218). This can be performed in a conventional manner using a channel estimator 118 and predefined transmitted pilots to estimate channel state information.

The second transceiver then performs forward error correction decoding on the transmission using the estimate of the channel to generate a set of bits corresponding to the binary bit stream (step 220). The forward error correction is performed using a bit-metric decoder 120, which as described in more detail below includes a soft decision calculator 120A and a forward error correction decoder 120B, to produce the set of bits $\hat{z}_p$. The second transceiver then demaps the set of bits into demapped unipolar M-PAM symbols (step 222). This is performed by binary demapper 122 to produce the unipolar M-PAM symbols $\hat{x}_p$. The second transceiver performs distribution dematching on the demapped unipolar M-PAM symbols to generate a set of received information bits (step 224). The distribution demapping is performed by distribution demapper 124 to produce the received information bits û.

Figure 1B:
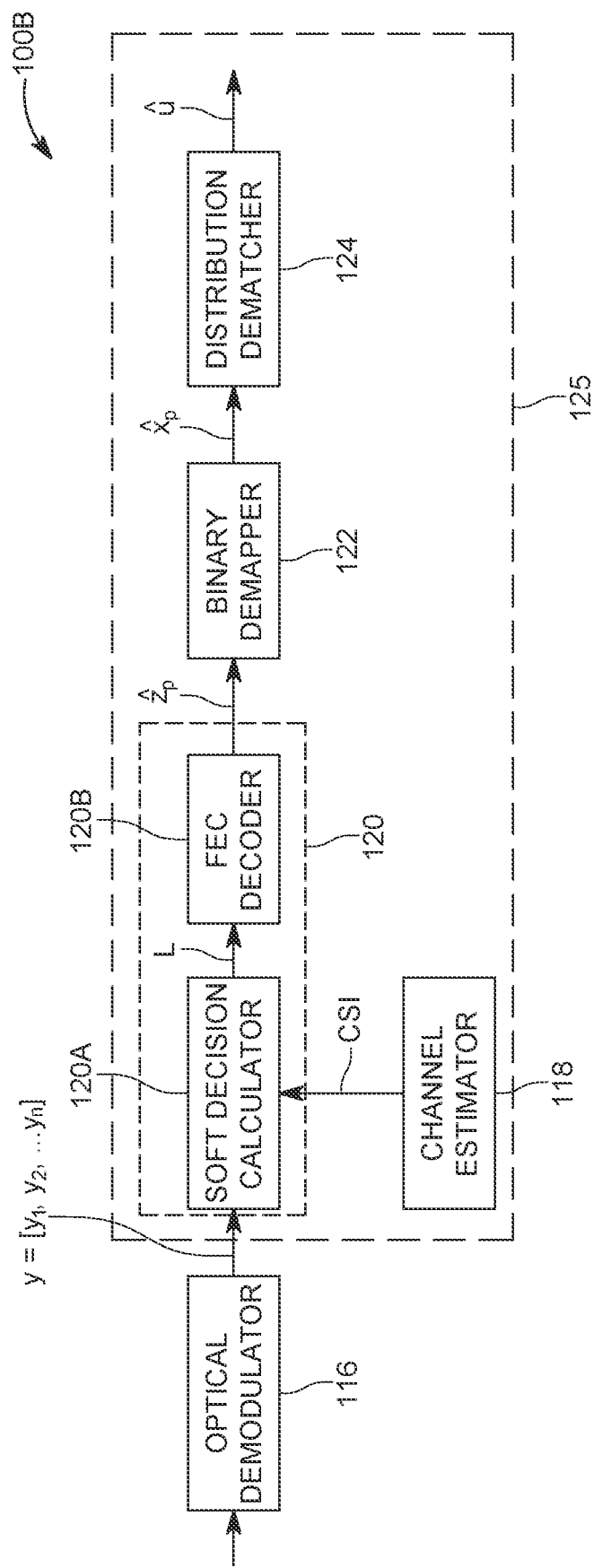

As illustrated in FIG. 1B, channel estimator 118, the bit-metric decoder 120, binary demapper 122, and distribution dematcher are collectively referred to as a decoder 125. It should be recognized that the receiver 100B can include additional components, such as filters and other components employed by conventional receivers.

As will be described in more detail below, the conversion using distribution matching by the first transceiver and distribution dematching by the second transceiver can be performed using a look-up table (also known as a codebook) or using arithmetic coding, the latter of which is described in detail in Reference Document [3]. Again, the distribution matching can be constant composition distribution matching or any other distribution matching and demapping techniques that probabilistically shape the information symbols. The distribution demapper uses the inverse of the technique employed by the distribution matcher.

As will be appreciated from the discussion below, the disclosed transceiver has a number of advantageous features. First, the IM/DD with M-PAM signaling has lower computational complexity, and it can be efficiently implemented compared to coherent modulation. Moreover, in the discussion below the distribution matching used by the transceiver is constant composition distribution matching, which is asymptotically optimal in the frame length, and a single binary forward error correction encoder and decoder at the transmitting transceiver and the receiving transceiver, respectively. Further, the rate can be adapted to the signal-to-noise ratio for various turbulence conditions with fine granularity. Moreover, in certain embodiments, the transmitter can operate within a pre-designed maximum outage probability in the absence of the channel state information at the transmitter.

First, the signal model is addressed. Consider n transmissions (channel uses) over a discrete-time free-space optical channel, also known as optical direct detection channel with Gaussian post-detection noise. In this channel, the input signal modulates the light intensity, while a photo-detector at the receiver produces a noisy signal that is proportional to the intensity. The dominant noise sources are thermal noise, intensity fluctuation noise by the laser source, and shot noise induced by ambient light. The contributions from all the noise sources can be modeled as additive white Gaussian noise. Hence, the received signal at time instant i can be written as $$Y_i = GX_i + W_i, \text{ for } i \in \{1, 2, \ldots, n\}, \quad (1)$$

where $X_i$ is the channel input, $W_i$ is a Gaussian noise with zero mean and variance $\sigma^2$, and G is a random variable representing the fading due to the atmospheric turbulence. In free-space optical systems, the channel changes slowly with respect to the bit rate. Hence, G is considered as a block fading process, and it is assumed to be fixed over the entire frame of n symbols. For moderate and strong turbulence, the irradiance fluctuations can be modeled as a Gamma-Gamma distribution. The probability density function (PDF) of the Gamma-Gamma random variable is $$f_G(g) = \frac{2(\alpha\beta)^{\frac{\alpha+\beta}{2}}}{\Gamma(\alpha)\Gamma(\beta)} g^{\frac{\alpha+\beta-2}{2}} K_{\alpha-\beta}(2\sqrt{\alpha\beta g}), g > 0, \quad (2)$$

where $K_a(\bullet)$ is the modified Bessel function of the second kind of order a, and the parameters $\alpha$ and $\beta$ are the effective number of small scale and large scale cells of the scattering environment, which can be expressed as a function of the Rytov variance, $\sigma_R^2$. For example, considering plane waves from Reference Document [4], equations (14)-(19), results in $$\alpha(\sigma_R) = \left[\exp\left(\frac{1+0.49\sigma_R^2}{\left(1.11\sigma_R^{\frac{12}{5}}\right)^{\frac{7}{6}}}\right) - 1\right]^{-1}, \quad (3)$$

$$\beta(\sigma_R) = \left[\exp\left(\frac{1+0.51\sigma_R^2}{\left(0.69\sigma_R^{\frac{12}{5}}\right)^{\frac{7}{6}}}\right) - 1\right]^{-1}$$

A common format for the channel input $X_i$ that can achieve a near capacity performance for IM/DD systems is unipolar M-PAM. Considering that the random variables $\{X_i\}_{i=1}^n$ are independent, identically distributed (i.i.d.), the probability mass function (PMF) of $X \in \{a_0, a_1, \ldots, a_{M-1}\}$ can be written as $$p \triangleq [p_0, p_1, \ldots, p_{M-1}],$$

where $a_j$ is the jth element of $$a \triangleq [0, \Delta, \ldots, (M-1)\Delta],$$

$\Delta > 0$ is the spacing between the symbols, and $p_j$ is the probability assigned to the constellation symbol $a_j$. The set that includes all possible symbol distributions is defined as $$\mathbb{S} = \{p : p = [p_0, p_1, \ldots, p_{M-1}], \Sigma_{j=0}^{M-1} p_j = 1, p_j \geq 0, \forall j \in \{0, 1, \ldots, M-1\}\} \quad (4)$$

The signal is also subject to an average optical power constraint, i.e., $$\mathbb{E}\{X\} = \Sigma_{j=0}^{M-1} p_j a_j \leq P, \quad (5)$$

where P is the average optical power limit. In fact, the optical power constraint is more relevant for free-space optical signals than the electrical power limit (i.e., $\mathbb{E}\{X^2\} \leq P$), widely adopted in RF systems. Also, the instantaneous optical signal-to-noise ratio, defined as $gP/\sigma$, is usually adopted in free-space optical communication, rather than the electrical optical signal-to-noise ratio.

To guarantee reliable communication with an arbitrarily low probability of error, the transmission rate should be less than the achievable rate of the coded modulation scheme. It should be recognized that terms rate and instantaneous rate are used interchangeably to indicate the rate at an instantaneous signal-to-noise ratio for a fixed g. On the other hand, the ergodic rate is the average rate over the irradiance distribution at a given $P/\sigma$.

The achievable rate depends on the distribution of the signal at the channel input. Accordingly, the input distribution should be optimized to maximize the achievable rate. In this regard, the capacity of unipolar M-PAM, $C(g)$, can be found for a given g as the optimal value of the following optimization problem $$\underset{\Delta > 0, p \in \mathbb{S}}{\text{maximize}} I(X; Y|G = g) \quad (6a)$$

$$\text{subject to } a^T p \leq P \quad (6b)$$

where $\mathbb{I}(X; Y|G=g) = h(Y|g) - h(Y|X, g)$ is the mutual information between X (i.e., the transmitter) and Y (i.e., the receiver) given $G=g$, $$h(y|g) \triangleq -\int_{-\infty}^{\infty} P_{Y|G}(y|g) \log P_{Y|G}(y|g) dy \quad (7)$$

$$h(y|X, g) = h(W) = \log(\sqrt{2\pi e \sigma}) \quad (8)$$

are differential conditional entropy functions, and $$P_{Y|G}(y|g) = \frac{1}{\sqrt{2\pi\sigma^2}} \sum_{j=0}^{M-1} p_j \exp\left(-\frac{(y-ga_j)^2}{2\sigma^2}\right) \quad (9)$$

is the distribution of the received signal conditioned on the channel gain. It should be recognized that the terms maximum achievable rate and capacity are used interchangeably. For notation simplicity, let $$I_\Delta(p|g) \triangleq I(X; Y|G = g)$$

to emphasize its dependence on the parameters of the input distribution, i.e., p and $\Delta$. For a fixed $\Delta$, the problem (6) is a convex optimization problem in p. In fact, $\mathbb{I}_\Delta(p|g)$ is a concave function in p from the concavity of the conditional entropy function in (7) and the composition with an affine mapping property. Therefore, it can be efficiently solved using any suitable convex optimization algorithm, e.g., interior-point method, and the optimal p at this $\Delta$, $p_\Delta$, can be computed. Now, it is required to find the optimal value of the constellation spacing that maximizes the mutual information. Because $\mathbb{I}_\Delta(p_\Delta|g)$ is unimodal in $\Delta$, any efficient optimization algorithm in one dimension can be employed to compute the optimal constellation spacing, $\Delta^*$, e.g., golden section search and successive parabolic interpolation discussed in Reference Document [5].

In order to achieve the maximum capacity, the channel input X should be probabilistically shaped to have a distribution with the optimal parameters obtained from (6). Unfortunately, there is no known computationally efficient and practical scheme in the literature that achieves this rate for unipolar M-PAM signals. For example, the efficient probabilistic amplitude shaping encoder, usually adopted for coherent fiber optical communications, cannot be used due to the asymmetric signaling around zero in unipolar M-PAM.

The coded modulation scheme for M-PAM for free-space optical communications according to embodiments will now be described in more detail. Two practical adaptive coded modulation methods are disclosed to increase the bandwidth efficiency of free-space optical communications by probabilistically shaping the input distribution. The first method considers that the channel state information is available at both the encoder 115 and decoder 125, as shown in FIGS. 1A and 1B. For the second method, the channel state information is assumed to be known only at the receiver's decoder 125 and therefore the transmitter's encoder 115 operates as a blind encoder. The discussion below first describes the encoder 115 and the maximum mutual information between the unipolar M-PAM signal at the channel input and the received noisy signal. Then, the decoder 125, its achievable rate, and the optimal feasible operating rate are discussed.

The disclosed embodiments employ a spare-dense encoder 115 at the transmitter. The encoder 115 should convert the input binary string of uniformly distributed bits into probabilistically shaped unipolar M-PAM symbols and perform channel coding so that the decoder 125 can reliably recover the original data from noisy measurements at the receiver. The proposed scheme is described in detail below.

First, the capacity-achieving distribution of the disclosed embodiments is computed, parameterized with p* and Δ*, which permits the highest reliable communication rate for a given signal-to-noise ratio. Algorithms to obtain the optimal distribution when channel state information is known at the encoder 115 and when only channel statistics are available are addressed below.

In general, distribution matching transforms the uniformly distributed input bit string, $u \in \{0,1\}^{k_p}$, into unipolar M-PAM symbols, $x_p \in \{0, \Delta^*, \ldots, (M-1)\Delta^*\}^{n_p}$ with the target distribution, p*. Several distribution matching techniques have been proposed in the literature with various computational complexity, rate loss, and parallelization ability. The constant composition distribution matching employed in the disclosed embodiments is an invertible mapping from a fixed-length vector of uniformly distributed bits to a fixed-length sequence of shaped symbols (i.e., amplitudes). The empirical distributions of all possible output sequences are identical, i.e., they have a constant composition. Therefore, every output sequence follows, to some extent, the target distribution. The target distribution should be quantized such that the probability of each symbol can be represented as a rational number, where the denominator is the frame length, $n_p$. In other words, the probability mass function of $X_p$, p*, is approximated by what is called $n_p$-type distribution in the form of $$\tilde{p} \triangleq \left[ \frac{z_0}{n_p}, \frac{z_1}{n_p}, \ldots, \frac{z_{M-1}}{n_p} \right],$$

where $z_j$ is an integer representing the number of times at which the jth symbol appears and $\Sigma_{j=0}^{M-1} z_j = n_p$. The discrepancy between the target and $n_p$-type distributions decreases with the output sequence length. Hence, for asymptotically large $n_p$, the quantization error for p* is negligible, i.e., $\lim_{n_p \to \infty} \tilde{p} = p^*$.

The number of input bits should be computed to quantify the constant composition distribution matching rate, $$R_{DM} \triangleq k_p / n_p.$$

The number of bits, $k_p$, that are required to be transformed to $n_p$ shaped symbols depends on the number of possible configurations (i.e., permutations) of the output symbols that have empirical distribution $\tilde{p}$. More precisely $$k_p = \left\lfloor \log \binom{n_p}{z_0, z_1, \ldots, z_{M-1}} \right\rfloor = \left\lfloor \log \left( \frac{n_p}{\Pi_{j=0}^{M-1}(z_j!)} \right) \right\rfloor, \quad (10)$$

where $z_j!$ is the factorial of $z_j$ and (.,:,.) is the multinomial coefficient that determines the number of permutations. As described in Reference Document [3], the rate of the constant composition distribution matching, i.e., the number of bits per output symbol, converges to the entropy of the source, for asymptotically large number of output symbols, i.e., $$\lim_{n_p \to \infty} \frac{k_p}{n_p} = H(X_p), \quad (11)$$

where $$H(X_p) \triangleq -\sum_{j=0}^{M-1} p_j \log(p_j)$$

is the entropy of the discrete random variable. On the other hand, for finite block lengths, the constant composition distribution matching exhibits a rate lower than the source entropy. As described in Reference Document [3], the rate loss can be upper bounded as $$R_{loss} \triangleq H(X_{\tilde{p}}) - R_{DM} \leq \frac{1 + (M-1)\log(n_p + M - 1)}{n_p}, \quad (12)$$

where $\mathbb{H}(X_{\tilde{p}})$ is an entropy of the $n_p$-type distributed random variable $X_{\tilde{p}}$. For example, $R_{loss} < 7.5 \times 10^{-4}$ bits/symbol for 8-PAM with frame length $n_p = 64800$, adopted in the second generation digital video broadcasting over satellite (DVB-S2).

For the invertible mapping between the bits and the symbols, large look-up table (LUT) (i.e., a codebook) can be used, in principle. However, for long block lengths, the size of the table is too large to be useful, i.e., $2^{R_{DM} n_p}$. Alternatively, as described in Reference Document [3], the mapping can be achieved in an algorithmic manner, e.g., arithmetic coding is considered for the constant composition distribution matching.

In order to achieve reliable communication with high spectral efficiency close to the channel capacity, a forward error correction scheme should be employed. Because one of the main targets is to keep the computational complexity low, a binary forward error correction encoder 115 is employed due to their low complexity compared to non-binary methods. In this regard, the probabilistically shaped M-PAM signal is first mapped into a binary string using a mapper $\mathbb{B}$, where each element of $x_p$ is labeled by $$m \triangleq \log(M)$$

bits, i.e., $$\mathbb{B}(x_{p_i}) = [b_{i,1}, b_{i,2}, \ldots, b_{i,m}], \text{ for } i \in \{1, 2, \ldots, n_p\}, \quad (13)$$

where $b_{i,\ell}$, is the $\ell$ th bit level of the ith symbol. The vector $$b_\ell \triangleq [b_{1,\ell}, b_{2,\ell}, \ldots, b_{n_p,\ell}]$$

contains all the bits of level $\ell \in \{1, 2, \ldots, m\}$. A single binary string, $z_p \in \{0, 1\}^{mn_p}$, is formed from the concatenation of the mapped bits for all the $n_p$ symbols, where $$z_p \triangleq [B(x_{p_1}), B(x_{p_2}), \ldots, B(x_{p_{n_p}})] \quad (14)$$

The proper choice of the binary mapper $\mathbb{B}$ improves the performance of the scheme, e.g., the reflected binary mapping (Gray code) yields good performance.

Any systematic binary forward error correction encoder with rate c, dimension $$\tilde{k} \triangleq mn_p,$$

and block length $$\tilde{n} \triangleq \tilde{k}/c$$

can be employed. The redundant information in terms of the parity bits can be generated by $$z_u = P^T z_p, \qquad (15)$$

where the multiplication is in the Galois field of two elements, and $P \in \{0, 1\}^{\tilde{k} \times (1-c)\tilde{n}}$ can be found by putting the code generator matrix in the standard form, $[I_{\tilde{k}}|P]$, with $I_{\tilde{k}}$ denoting the $\tilde{k} \times \tilde{k}$ identity matrix.

Although the vector $z_p$ at the input of the forward error correction is probabilistically shaped, the parity bits, $z_u$, tend to be uniformly distributed, which is attributed to the fact that each redundancy bit results from a modulo-2 sum of a large number of bits. These parity bits are mapped to the corresponding unipolar M-PAM symbols by binary demapper $\mathbb{B}^{-1}$, i.e., $$\mathbb{B}^{-1}(z_u) = x_u \in \{0, \Delta^*, \ldots, (M-1)\Delta^*\}^{(1-c)n}, \qquad (16)$$

which are also uniformly distributed.

The parity symbols, $x_u$, are appended to the probabilistically shaped symbols, $x_p$, to form the codeword $x = [x_p, x_u]$, with $n = n_p/c = \tilde{n}/m$ symbols. Because part of the time (channel uses) is dedicated to the shaped symbols while the other part is reserved for uniform symbols, the disclosed method can be considered as a time-sharing encoder. From another perspective, if one considers the amount of information in each part, the system can be regarded as a sparse-dense transmission (SDT) scheme because the uniform distribution maximizes the source entropy (dense information representation), while the probabilistically shaped symbols have less amount of information (sparse). In the following, the disclosed method is described as sparse-dense with constant composition based coded modulation for free-space optical communication (SpaDCoM).

The capacity of sparse-dense signaling can be considered as an upper bound on the achievable rate of the SpaDCoM for a given forward error correction rate. It is therefore beneficial to compute the maximum mutual information (i.e., capacity) of the sparse-dense transmission regardless if such a rate is achievable or not by the disclosed SpaDCoM technique. First, $X_p$ is defined as the random variable representing the probabilistically shaped symbols, $\{X_i\}_{i=1}^{n_c}$, and $X_u$ as the random variable representing the uniformly distributed symbols, $\{X_i\}_{i=n_c+1}^{n}$. The capacity of the sparse-dense transmission, $C_{SDT}(g)$, can be found from (1) and (6) as the optimal value for the following optimization problem $$\underset{\Delta > 0, p \in S}{\text{maximize}} R_{SDT}(g, \Delta, p) \triangleq cH_\Delta(p|g) + (1-c)H_\Delta(u|g) \qquad (17a)$$

$$\text{subject to } ca^T p + 0.5\Delta(1-c)(M-1) \leq P, \qquad (17b)$$

where $$p_j \triangleq \mathbb{P}\{X_p = a_j\} \text{ and } u_j \triangleq \mathbb{P}\{X_u = a_j\} = 1/M,$$

for $j \in \{0, 1, \ldots, M-1\}$. Similar to (6), the optimization problem is convex in the probability vector p, for a fixed $\Delta$, where $(1-c)\mathbb{I}_\Delta(u|g)$ and $0.5\Delta(1-c)(M-1)$ are constants that do not depend on p. Hence, the interior-point algorithm can be used to find the optimal probabilities. Regarding $\Delta$, the golden section method can be adopted to obtain the value of $\Delta$ that maximizes the achievable rate within its feasibility range. The range of $\Delta$ that satisfies the power constraint can be found from (17b) as $$\Delta \leq \frac{P}{c \sum_{j=0}^{M-1} j p_j + 0.5(1-c)(M-1)} \leq \frac{2P}{(1-c)(M-1)} \qquad (18)$$

where the second inequality holds with equality if $p = [1, 0, \ldots, 0]$. The sparse-dense transmission capacity can now be expressed, for a given g, as $C_{SDT}(g) = R_{SDT}(g, \Delta^*, p^*)$, where $\Delta^*$ and $p^*$ are the optimal symbol spacing and probabilities obtained as the solution of optimization problem (17).

As discussed above, the disclosed SpaDCoM technique employs a bit-metric decoder 125. In the decoder 125, the forward error correction decoding is performed before the distribution dematching (i.e., reverse concatenation architecture). The reverse concatenation method prevents the common problem of the burst of errors after the distribution dematching, due to the receipt of erroneous symbols from the channel. For the forward error correction decoding, the capacity of the spare-dense transmission, computed above, could be achieved using an optimal symbol-metric decoder (SMD). However, the computational complexity of symbol-metric decoding is high. In contrast, a bit-metric decoder (BMD) can yield a rate close to $C_{SDT}(g)$, while having lower complexity. For bit-metric decoding with soft decisions, one real number is computed for each bit level of each received symbol, representing the likelihood of this bit. The log-likelihood ratio (LLR) of the $\ell$ th bit level can be written given the received symbol $y_i$ as $$L_{i,\ell} = \log \frac{f_{B_{i,\ell}|Y_i,G}(0|y_i, g)}{f_{B_{i,\ell}|Y_i,G}(1|y_i, g)} = \log \frac{\sum_{x \in \mathcal{X}_\ell^0} f_{Y_i|X,G}(y_i|x, g) \mathbb{P}\{X_i = x\}}{\sum_{x \in \mathcal{X}_\ell^1} f_{Y_i|X,G}(y_i|x, g) \mathbb{P}\{X_i = x\}} \qquad (19)$$

where g is the value of the channel gain, which is correctly estimated at the receiver, $B_{i,\ell}$ is a random variable representing the $\ell$ th level bit of the ith symbol, and the sets $\mathcal{X}_\ell^0$ and $\mathcal{X}_\ell^1$ include all the values of x such that the $\ell$ th level of their binary mapping equals 0 and 1, respectively. Because the distribution of the signal $X_i$ depends on the time instant i for the sparse-dense transmission scheme, the log-likelihood ratio can be written as $$L_{i,l} = \begin{cases} \log \dfrac{\sum_{x \in X_l^0} f_{Y_i|X,G}(y_i \mid x, g)\mathbb{P}\{X_p = x\}}{\sum_{x \in X_l^1} f_{Y_i|X,G}(y_i \mid x, g)\mathbb{P}\{X_p = x\}} & \\ \quad \text{for } i \in \{1, 2, \ldots, cn\} & \\ \log \dfrac{\sum_{x \in X_l^0} f_{Y_i|X,G}(y_i \mid x, g)}{\sum_{x \in X_l^1} f_{Y_i|X,G}(y_i \mid x, g)} & \\ \quad \text{for } i \in \{cn+1, cn+2, \ldots n\} & \end{cases} \quad (20)$$

Because the log-likelihood ratios are the sufficient statistics to recover the transmitted bits, they are provided to the forward error correction decoder for soft decision decoding of the binary bits. Finally, the estimated bits are mapped into the corresponding symbols. The distribution dematching maps the first $n_p$ estimated symbols into their $k_p$ associated bits.

The achievable rate of the bit metric decoding for pulse amplitude shaping has been investigated in the literature. For sparse-dense transmission, first define the random variables $$B_p = [B_{p_1} B_{p_2}, \ldots, B_{p_m}] \triangleq \mathbb{B}(X_p), \; B_u \triangleq \mathbb{B}(X_u), \; Y_p \triangleq X_p + W,$$

and $Y_u \triangleq X_u + W$.

An achievable rate with BMD for the sparse-dense transmission can then be written as $$R_{BMD}(g,\Delta,p) = (1-c)[\mathbb{H}(B_u) - \sum_{\ell=1}^m \mathbb{H}(B_{u\ell} \mid Y_u, G)]^+ + c[\mathbb{H}(B_-) - \sum_{\ell=1}^m \mathbb{H}(B_{p\ell} \mid Y_p, G)]^+ = (1-c)[m \sum_{\ell=1}^m \mathbb{H}(B_{u\ell} \mid Y_u, G)]^+ + c[\mathbb{H}(X_p) - \sum_{\ell=1}^m \mathbb{H}(B_{p\ell} \mid Y_p, G)]^+ \quad (21)$$

where $$[x]^+ \triangleq \max(x, 0)$$

gives the maximum between x and zero. Equation (21) is due to the one-to-one mapping between X and its binary vector representation $\mathbb{B}(X)$. The maximum achievable rate using bit-metric decoding can be found by maximizing $R_{BMD}(g, \Delta, p)$ subject to an average power constraint. Nevertheless, the problem is not convex, and accordingly an achievable rate (not the maximum) is obtained by considering the distribution obtained by solving (17). The achievable rate of the sparse-dense transmission with bit-metric decoding can now be written as $$C_{BMD}(g) \triangleq R_{BMD}(g, \Delta^*, p^*).$$

It should be noted that $C_{BMD}(g)$ represents an achievable rate for bit-metric decoding and not its capacity. Although the achievable rate of bit-metric decoding is less than that provided by symbol-metric decoding, the rate loss is small, as illustrated in the numerical results discussed below.

Another metric to quantify an achievable information rate is the generalized mutual information (GMI), as defined in equation (12) in Reference Document [6]. The generalized mutual information quantifies the number of transmitted bits per symbol in a way similar to what mutual information does. However, the generalized mutual information considers a mismatched decoding metric, e.g., bit-metric decoding, in contrast to the implied optimal decoder to achieve the rate indicated by the mutual information.

For pulse amplitude shaping, it has been shown that the generalized mutual information equals the achievable rate with bit-metric decoding, as discussed in reference Document [6]. Here it is noted that the generalized mutual information in Reference Document [6] does not account for the optimization over various decoding metrics with the same codeword ranking performance. For the disclosed probabilistic shaping method with sparse-dense transmission, the generalized mutual information has the same expression as the achievable rate of the proposed scheme under bit-metric decoding, $R_{BMD}(g, \Delta, p)$. This can be proved starting from equation (13) in Reference Document [6] and by noting that the transmitted bits are probabilistically shaped only for 100c % of the channel uses.

In order to achieve reliable communication, the transmission rate should be less than the maximum achievable rate for the disclosed SpaDCoM technique with bit-metric decoding. Hence, the transmission rate of the SpaDCoM technique should be determined. Because the information bits need to be transmitted are $k_p$ bits in n channel uses, the overall transmission rate can be written from (11) when $n \to \infty$ as $$R(p) = \frac{k_p}{n} = c\frac{k_p}{n_p} = c\mathbb{H}(X_p) \quad (22)$$

It is clear from (22) that the transmission rate depends on the input distribution and the forward error correction rate. Therefore, the SpaDCoM technique quantifies the maximum forward error correction rate such that the transmission rate is achievable, i.e., $R(p) \leq R_{BMD}(g, \Delta, p)$. In the literature, the achievable binary code rate and normalized generalized mutual information (NGMI) metrics are usually adopted to quantify the number of information bits per transmitted bits. In the SpaDCoM technique, the achievable binary code rate is represented from (21) and (22) for a given p as $$ABR = \frac{\left[m - \sum_{l=1}^m \mathbb{H}(B_{ul} \mid Y_u, G)\right]^+}{\mathbb{H}(x_p) - \left[\mathbb{H}(x_p) - \sum_{l=1}^m \mathbb{H}(B_{u_l} \mid Y_u G)\right]^+ + \chi} \quad (23)$$

where $$\chi \triangleq \left[m - \sum_{l=1}^m \mathbb{H}(B_{u_l} \mid Y_u, G)\right]^+.$$

The normalized generalized mutual information has the same expression as the achievable binary code rate for pulse amplitude shaping, under some conditions on the decoding metric.

For a fixed forward error correction rate, the optimal distribution p* that maximizes the achievable rate in (17)

can lead to an unachievable transmission rate, i.e., $R(p^*) > R_{BMD}(g, \Delta^*, p^*)$. Accordingly, the optimal operating signal-to-noise ratio that permits the maximum transmission rate such that reliable communication is still feasible is evaluated. First, when the channel state information is known at both the transmitter and receiver is addressed. For a given instantaneous optical signal-to-noise ratio, $gP/\sigma$, the optimal distribution that maximizes (17) is calculated. Accordingly, the capacity $C_{SDT}(g)$, the achievable rate with bit-metric decoding, and the transmission rate are computed from (17), (21), and (22), respectively. Then, the optimal operating point is the intersection between the achievable and transmission rates, i.e., $R(p^*) = R_{BMD}(g, \Delta^*, p^*)$. In order to achieve reliable communication at the optimal operating point, an asymptotically long FEC code should be used. For practical finite-rate codes, lower rates should be considered, e.g., $R = R_{BMD} - R_{backoff}$, where $R_{backoff} > 0$ is a back-off rate to account for the non-optimal forward error correction codes.

Figure 3A:
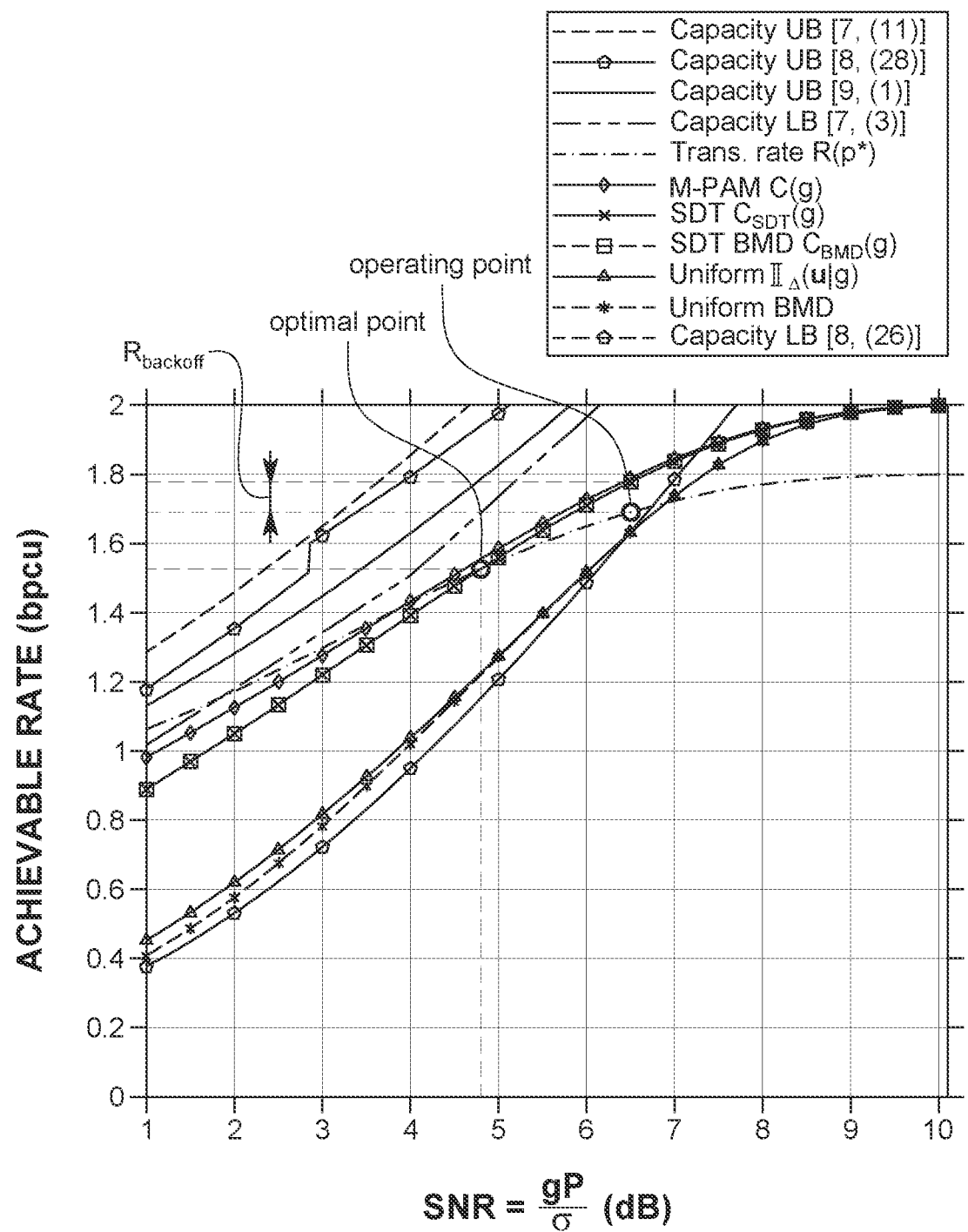
FIGS. 3A and 3B illustrate the achievable rate versus signal-to-noise ratio for M=4 and c=0.9 for FIG. 3A and c=0.8 for FIG. 3B according to embodiments.
Figure 3B:
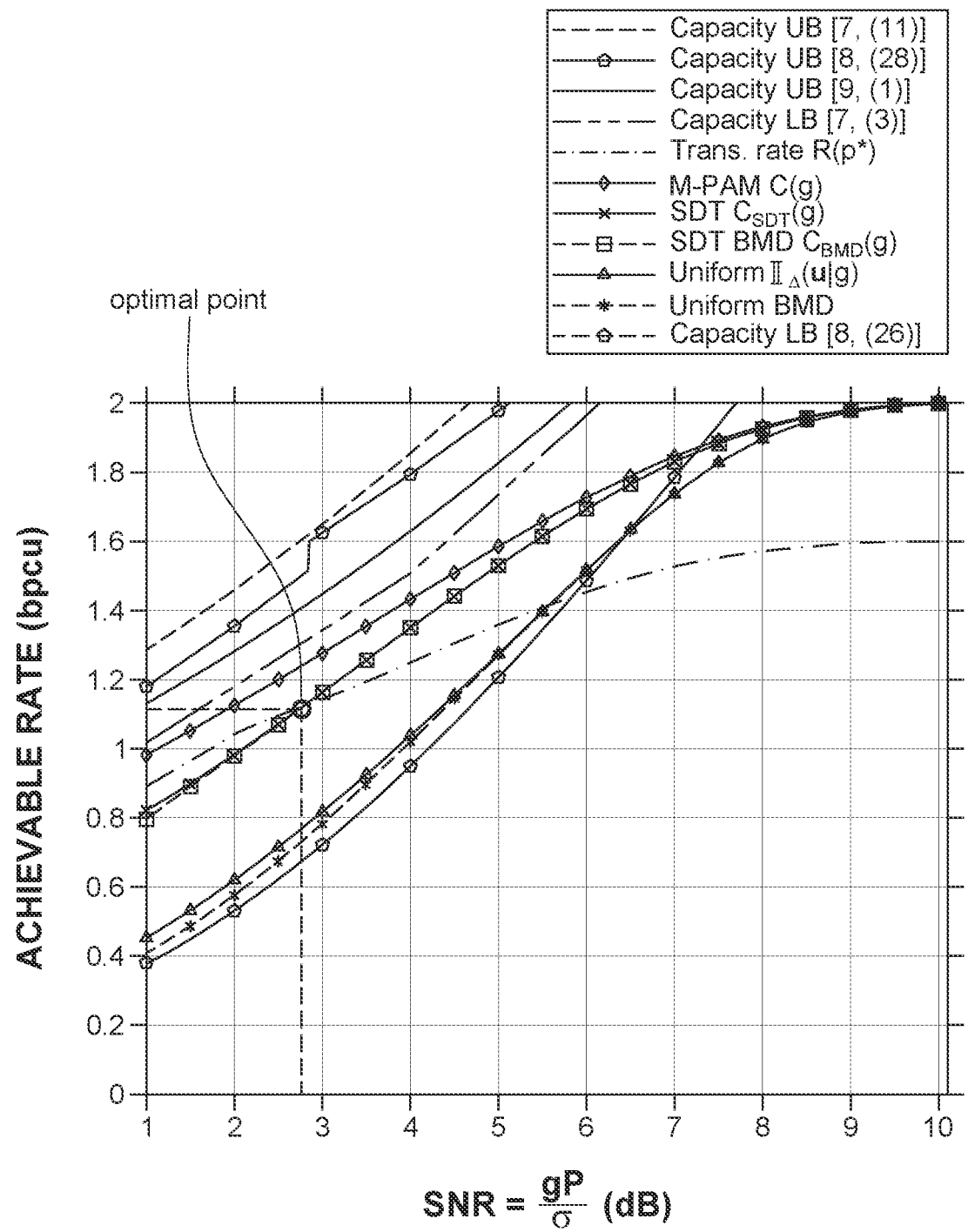

FIGS. 3A and 3B illustrate the capacity, achievable rate, and transmission rate of bit-metric decoding, sparse-dense transmission, and uniform signaling for various signal-to-noise ratios. Several upper and lower bounds on the capacity of intensity channels, i.e., equations (3) and (11) in Reference Document [7], equations (26) and (28) in Reference Document [8], and equation (1) in Reference Document [9], are shown in FIGS. 3A and 3B. For c=0.9 in FIG. 3A, it can be seen that the optimal signal-to-noise ratio is 4.8 dB, leading to a transmission rate of 1.524 bpcu. The rate gap with respect to the tightest lower and upper bounds on the capacity of IM/DD channel, i.e., equation (3) in Reference Document [7] and equation (1) in Reference Document [9], is 0.15 and 0.25, respectively. An example of a practical operating point for finite-length forward error correction codes is provided, which follows the transmission rate curve. It can be seen that for signal-to-noise ratios lower than the optimal point, the transmission rate is unachievable, while at higher signal-to-noise ratios, the rate gap increases.

For FIG. 3B with c=0.8, the optimal operating point is at a signal-to-noise ratio of 2.8 dB and transmission rate of 1.115 bpcu, which are lower than their corresponding values for c=0.9. Also, we can notice that the difference between the achievable rate of M-PAM, i.e., all the symbols can be probabilistically shaped, and sparse-dense transmission is 0.125 bpcu for c=0.8, which is larger than the corresponding value for c=0.9, i.e., 0.075 bpcu. The reason is that the number of uniformly distributed symbols (not probabilistically shaped) is inversely proportional to the coding rate.

Regarding the blind encoder, i.e., the channel station information is available only at the decoder 125, it cannot be guaranteed that the transmission rate is always less than the achievable rate due to the achievable rate is a random variable as a function of the channel irradiance fluctuation. Accordingly, there is a nonzero probability that the transmission rate is not achievable, leading to an outage probability. In this case, the encoder 115 can be designed with the worst-case channel condition to guarantee that the outage probability is less than a predefined threshold, which can be achieved by considering a fixed channel gain $g = \bar{g}$ such that the outage probability is upper bounded by the target level, as described below.

In the discussion above a single optimal point was obtained for each forward error correction rate, i.e., the rate at which the sparse-dense transmission capacity equals the transmission rate. A technique to obtain the maximum achievable transmission rate of the SpaDCoM technique and the corresponding input distribution for any given signal-to-noise ratio will now be described. This can be done by also optimizing the rate of the channel encoder 115. Additionally, in order to guarantee that the transmission rate is achievable for the considered signal-to-noise ratio, an additional constraint is added such that the input distribution yields an achievable transmission rate. Specifically, the capacity of the SpaDCoM technique can be formulated as $$\underset{\Delta > 0, p \in \mathbb{S}, 0 < c \leq 1}{\text{maximize}} \quad R_{SDT}(g\Delta, p) \tag{24}$$

$$\text{subject to} \quad ca^T p + (1-c)\Delta \frac{M-1}{2} \leq P,$$
$$R(p) = R_{SDT}(g\Delta, p).$$

In order to simplify (24), the rate constraint can be eliminated by choosing the channel coding rate such that the achievable rate equals the transmission rate. In particular, the forward error correction rate is written for a fixed p from (17) and (22) as $$c(p) = \frac{\mathbb{I}_\Delta(u \mid g)}{\mathbb{H}(X_p) - \mathbb{I}_\Delta(p \mid g) + \mathbb{I}_\Delta(u \mid g)} \tag{25}$$

Because the transmission rate equals the achievable rate, it is equivalent to maximize $R(p)$ or $R_{SDT}(g, \Delta, p)$. Substituting the channel coding rate into the (24) the optimization problem then becomes $$\underset{\Delta > 0, p \in \mathbb{S}}{\text{maximize}} \quad \frac{\mathbb{H}(X_p) \mathbb{I}_\Delta(u \mid g)}{\mathbb{H}(X_p) - \mathbb{I}_\Delta(p \mid g) + \mathbb{I}_\Delta(u \mid g)} \tag{26}$$

$$\text{subject to} \quad \beta_\Delta[\mathbb{H}(X_p) - \mathbb{I}_\Delta(p \mid g)] + a^T p - P \leq 0$$

where $$\beta_\Delta \triangleq (0.5\Delta(M-1) - P)/I_\Delta(u \mid g)$$

and the equality constraint is eliminated, as it is always active because of the proper formulation of the coding rate in (25). The optimal value of the maximization problem is defined by $R_{SDOR}(g)$, $R_{SDT}(g, \Delta, p^*)$, where the probability mass function $p^*$ maximizes (26) for a given $\Delta$. Because $R_{SDOR}(g)$ is the maximum possible rate after the PMF optimization $$\frac{\mathbb{H}(X_p) \mathbb{I}_\Delta(u \mid g)}{\mathbb{H}(X_p) - \mathbb{I}_\Delta(p \mid g) + \mathbb{I}_\Delta(u \mid g)} \leq R_{SDOR}(g) \tag{27}$$

with equality if $p = p^*$. By multiplying both sides by $\mathbb{H}(X_p) - \mathbb{I}_\Delta(p \mid g) + \mathbb{I}_\Delta(u \mid g) \geq 0$, equation (27) can be written as $$R_{SDOR}(g)[\mathbb{H}(X_p) - \mathbb{I}_\Delta(p \mid g) + \mathbb{I}_\Delta(u \mid g)] - \mathbb{H}(X_p) \mathbb{I}_\Delta(u \mid g) \geq 0 \tag{28}$$

with equality if $p = p^*$. Hence, equation will need to be minimized (28) to obtain near optimal p, i.e., $$\underset{p \in \mathbb{S}}{\text{minimize}} \quad R_{SDOR}(g)[\mathbb{H}(X_p) - \mathbb{I}_\Delta(p \mid g) + \mathbb{I}_\Delta(u \mid g)] - \mathbb{H}(X_p) \mathbb{I}_\Delta(u \mid g) \tag{29}$$

$$\text{subject to} \quad a^T p - \beta_\Delta \mathbb{I}_\Delta(p \mid g) + \beta_\Delta \mathbb{H}(X_p) - P \leq 0$$

Generally, the capacity $R_{SDOR}(g)$ is not known a priori. It can therefore be substituted with a preliminary estimate, $$r \triangleq R_{SDT}(g, \Delta, \dot{p}), \quad (5)$$

around an initial point $\dot{p}$ that is iteratively updated. After some manipulations and by dividing the objective function by the constant $\mathbb{I}_A(u|g)$, the problem becomes $$\underset{p \in \mathbb{S}}{\text{minimize }} r \left[ 1 - \overbrace{\frac{\mathbb{I}_A(p|g)}{\mathbb{I}_A(u|g)}}^{f_0(p,r)} \right] - \mathbb{H}(X_p) \left[ 1 - \overbrace{\frac{r}{\mathbb{I}_A(u|g)}}^{\psi_0(p,r)} \right] \quad (30a)$$

$$\text{subject to } \overbrace{a^T p - \beta_\Delta \mathbb{I}_A(p|g) - P}^{f_1(p)} - \overbrace{(-\beta_\Delta \mathbb{H}(X_p))}^{\psi_1(p)} \leq 0 \quad (30b)$$

The optimization problem (30) is not convex, but it can be reformulated as a difference of convex (DC) problem. In fact, both the objective function and power constraint are represented as difference of convex functions, for $r > \mathbb{I}_A(u|g)$ and $\beta_\Delta \geq 0$ (i.e., $\Delta \geq 2P/[M-1]$). This is because $-\mathbb{I}_A(p|g)$ and $-\mathbb{H}(X_p)$ are convex functions, while $a_T p$ is an affine.

A local minimum for the difference of convex problem can be obtained through many iterative algorithms, e.g., the convex-concave procedure described in Reference Document [10]. In this method, the subtracted convex function is approximated by a Taylor expansion of the first-order around a feasible initial point, $\dot{p}$, which is successively updated till convergence. More precisely, $\psi_0(p,r)$ is replaced with $$\overline{\psi}_0(p, \dot{p}, r) \triangleq \psi_0(\dot{p}, r) + \sum_{j=0}^{M-1} \left. \frac{\delta \psi_{0(p,r)}}{\delta p_j} \right|_{p_j = \dot{p}_j} \quad (31)$$

$$(p_j = \dot{p}_j) = \left[ \frac{r}{\mathbb{I}_A(u|g)} - 1 \right] \sum_{j=0}^{M-1} p_j \log(\dot{p}_j)$$

Similarly, the constraint $f_1(p) - \psi_1(p) \leq 0$ can be convexified by substituting $\psi_1(p)$ with $$\overline{\psi}_1(p, \dot{p}) \triangleq \beta_\Delta \sum_{j=0}^{M-1} p_j \log(\dot{p}_j)$$

In summary, the probability of the symbols, their spacing, and the FEC rate are optimized to maximize the mutual information (i.e., maximum achievable rate) subject to rate and power constraints. The FEC is selected to satisfy the rate constraints (i.e., the transmit rate is achievable). Then, the problem is convexified by applying a difference of convex relaxation method for both the objective function and the constraint, as detailed in Algorithm 1. Accordingly, Algorithm 1 for SpaDCoM with an optimal forward error correction rate, which is executed by the distribution optimizer 114, is as follows:

1: Input $\Delta, \dot{p}, \delta_1, \delta_2$ % $\delta_1$ and $\delta_2$ are the stopping criteria tolerances
2: repeat
3:    $r := R_{SDT}(g, \Delta, \dot{p})$ -continued 4:    repeat
5:        Solve the following convex problem $$\ddot{p} = \underset{p \in \mathbb{S}}{\operatorname{argmin}} f_0(p, r) - \overline{\psi}_0(p, \dot{p}, r)$$

subject to $f_1(p) - \overline{\psi}\_1(p, \dot{p}) \leq 0$
6:        $\delta_f := [f_0(\dot{p}, r) - \psi_0(\dot{p}, r)] - [f_0(\ddot{p}, r) - \psi_0(\ddot{p}, r)]$
7:        update $\dot{p} := \ddot{p}$
8:    until $|\delta_f| < \delta_1$
9:    until $|R_{SDT}(g, \Delta, \dot{p}) - r| < \delta_2$
10:  $p_\Delta := \dot{p}$
11:  Output $p_\Delta, R_{SDT}(g, \Delta, p_\Delta), R_{BMD}(g, \Delta, p_\Delta)$ The convex-concave procedure is described in Algorithm 1 for a fixed $\Delta$. Then, the golden section method can be used to search for the optimal constellation spacing, $\Delta^*$, and the associated probabilities $$p^* \triangleq p_{\Delta^*}$$

that lead to the maximum achievable rate. Additionally, it can be proved that the solution of the convexified problem is still subject to the average power constraint $\psi_1$ in (30b). From the convexity of $\psi_1(p)$, we have $\psi_1(p) \geq \overline{\psi}_1(p, \dot{p})$ leading to $$f_1(p,r) - \psi_1(p,\dot{p},r) \leq f_1(p,r) - \overline{\psi}_1(p,\dot{p},r) \leq 0 \quad (32)$$

Although the solution is feasible, some of the feasibility range is lost because of the power constraint relaxation. Therefore, a feasible sub-optimal input distribution can be obtained that yields an achievable rate of the scheme with SMD metric.

The capacity of the SpaDCoM technique can be obtained through the above-indicated procedure. However, optimal forward error correction encoders are required. More specifically, the optimal channel coding rate, $c(p^*)$, can take any real value between zero and one but most of the encoders allow only several operational modes with predefined forward error correction rates. In this case, the system can sub-optimally operate on the maximum allowable forward error correction rate, which is slightly less than $c(p^*)$. This leads to a transmission rate that is lower than the achievable rate. Nevertheless, there is no guarantee that the average power constraint is not being violated when operating on lower forward error correction rate.

A method for calculating the achievable rate of SpaDCoM with a practical bit-metric decoder with a finite set of coding rates will now be discussed. Specifically, the following describes how the disclosed adaptive method can be implemented using practical off-the-shelf channel encoders with predefined forward error correction rates and bit-metric decoders. For example, the DVB-S2 considers LDPC channel encoders with coding rate $$c \in \mathbb{R}_C \left\{ \frac{1}{4}, \frac{1}{3}, \frac{2}{5}, \frac{1}{2}, \frac{3}{5}, \frac{2}{3}, \frac{3}{4}, \frac{4}{5}, \frac{5}{6}, \frac{8}{9}, \frac{9}{10} \right\} \quad (33)$$

while the newer standard DVB-S2X permits more rates. Then, the computational complexity of the SpaDCoM technique is analyzed.

A method to obtain the input distribution that maximizes the spectral efficiency of the disclosed SpaDCoM technique with bit-metric decoding is first determined. For a given forward error correction rate, the maximum possible transmission rate that is achievable by the SpaDCoM technique is determined. The transmission rate is maximized, while satisfying both the power and rate constraints. The maximum achievable transmission rate can be found by solving the following optimization problem $$\underset{\Delta>0, p \in \mathbb{S}}{\text{maximize}} \quad R(p) \tag{34}$$

$$\text{subject to} \quad c a^T p + (1-c)\Delta \frac{M-1}{2} \leq P, R(p) \leq R_{SDT}(g, \Delta, p) - R_{backoff}$$

where $R_{backoff} \leq (1-c) \mathbb{I}_\Delta(u|g)$ is a back-off rate to account for the reduced achievable rate with BMD, which can be iteratively set as indicated in Algorithm 2 (reproduced below). Note that the back-off rate can further be set to compensate for the rate loss due to the use of the finite-length channel coders. The three main differences between the optimization problem in (34) when compared to (24) is that the transmission rate is maximized rather than the mutual information, the rate is forced to be less than the mutual information with a margin allowing the use of a low complexity bit-metric decoder, and the forward error correction rate is fixed. These modifications allow obtaining the maximum achievable rate of the SpaDCoM scheme with practical forward error correction encoders and bit-metric decoders. Due to the second constraint, the optimization problem (34) is not convex. It can be convexified by noting that the constraint can be reformulated as a difference of convex problem. The convex-concave procedure can then be applied as before. Specifically, the following convex problem is iteratively solved $$\underset{\Delta>0, p \in \mathbb{S}}{\text{maximize}} \quad c \mathbb{H}(X_p) \tag{35}$$

$$\text{subject to} \quad c a^T p + (1-c)\Delta \frac{M-1}{2} \leq P,$$

$$-c \mathbb{I}_\Delta(p \mid g) - (1-c)\mathbb{I}_\Delta(u \mid g) -$$

$$c \sum_{j=0}^{M-1} p_j \log(\dot{p}_j) + R_{backoff} \leq 0$$

where $\dot{p}$ is an initial feasible point.

In summary, the probabilities of the symbols and their spacing are optimized to maximize the transmission rate (spectral efficiency) of SpaDCoM subject to rate and power constraints. Consideration is also given to a low complexity bit-metric decoder; therefore, the back-off rate is iteratively updated to compensate for the rate loss due to using a bit-metric decoder instead of a symbol-metric decoder. For a given forward error correction rate, the maximum possible transmission rate that is achievable by the SpaDCoM technique is determined. The transmission rate is maximized while satisfying both the power and rate constraints. Then, the problem is convexified by applying a difference of convex relaxation method for the rate constraint, as detailed in Algorithm 2, which is performed by the distribution optimizer 114:

1: Input $\Delta, \dot{p}, \delta, R_{backoff}$  % $\delta$ is the stopping criteria tolerance
2: repeat
3: repeat
4:  $R_{backoff} := \min(R)_{backoff}, (1-c)\mathbb{I}_\Delta(u|g))$
5:  Solve the convex problem (35) with interior-point method
6:  Assign the optimal PMF to $\ddot{p}$
7:  $\delta_R := R(\ddot{p}) - R(\dot{p})$
8:  Update $\dot{p} := \ddot{p}$
9: until $|\delta_R| < \delta$
10: $p^*_\Delta := \dot{p}$
11: $\delta_{BMDR_P} := R_{BMD}(g, \Delta, p^*_\Delta) - R(p^*_\Delta)$ % Transmission back-off with respect to BMD
12: if $\delta_{BMDR_P} < 0$ then
13:  $R_{backoff} := R_{backoff} + \delta_{BMDR_P}$
14: end if
15: until $\delta_{BMDR_P} \geq 0$
16: Output $p^*_\Delta, R_{SDT}(g, \Delta, p^*_\Delta), R_{BMD}(g, \Delta, p^*_\Delta)$ The optimal constellation spacing is obtained also using the golden section search method. The procedure is repeated for each supported forward error correction rate, and the optimal channel coding rate $c^* \in \mathbb{R}_c$ is the one that yields the maximum transmission rate for the proposed method, denoted by $R_{SpaDCoM}(g)$.

The same procedure can be repeated for all the modulation orders M supported by the encoder 115. The M-ary modulation that yields the largest transmission rate, for the considered signal-to-noise ratio, is then selected. Alternatively, in order to reduce the modulation complexity, the minimum M-ary modulation that yields the target rate for the considered signal-to-noise ratio can be employed.

The disclosed SpaDCoM technique adapts the rate according to the channel condition. Accordingly, the ergodic transmission rate for the SpaDCoM technique can be written as $$R_{SpaDCoM}\left(\frac{P}{\sigma}\right) = \int_0^\infty R_{SpaDCoM}(g) f_G(g) \mathrm{d}g, \tag{36}$$

where $R_{SpaDCoM}(g)$ is the maximum transmission rate for a given instantaneous signal-to-noise ratio, i.e., $gP/\sigma$, and $f_G(g)$ is the probability density function of the irradiance in (2).

The computational complexity of the disclosed SpaDCoM technique is now analyzed. The complexity is mainly due to the numerical optimization (required for computing the input distribution) and distribution matching/dematching through the constant composition distribution matching. Because the forward error correction coding state is standard for both uniform and non-uniform signaling, the associated complexity is not addressed.

For computing the capacity-achieving distribution of the proposed scheme, Algorithm 2 should be run for each value of $\Delta$. Define $z_\delta$ as the number of iterations until rate convergence in Algorithm 2, which depends on the stopping criteria $\delta$, $z_{GS}$ as the number of iterations till convergence for the golden section algorithm to find the optimal $\Delta$, and $z_c$ as the number of code rates supported by the forward error correction coder.

Accordingly, the optimal distribution can be obtained by solving $z_\delta z_{GS} z_c$ convex optimization problems. The computation complexity for solving a single convex optimization problem using interior-point method is on the order of $M^3$, i.e., $\mathcal{O}(M^3)$.

The optimization can either be performed online or offline, depending on the available computational capability at the transmitter. For instance, considering offline optimization, the optimal modulation order, probabilities of symbols, constellation spacing, and forward error correction rate can be obtained for a predefined set of signal-to-noise ratios with fine arbitrary quantization and stored in the memory, reducing the computational complexity at the expense of some rate loss due to the quantization.

For distribution matching the constant composition distribution matching is implemented using arithmetic coding (as described in Reference Document [3]), which requires $k_p$ iterations for the matching, while it needs $n_p$ for dematching. Each iteration involves M additions, multiplications, and comparisons. Unfortunately, the algorithms for arithmetic coding are sequential in nature; hence, it is a challenging task to parallelize the implementation.

Several methods have been proposed in the literature to reduce the computational complexity and increase the parallelization capability of distribution matching methods, including constant composition distribution matching. In particular, efficient implementation of the constant composition distribution matching using finite-precision algorithms has been proposed. A parallel architecture for a constant composition distribution matching has also been proposed with a subset ranking algorithm rather than arithmetic codes. Alternatively, the Multiset-Partition Distribution Matching (MPDM) is a non-constant composition distribution matching that can achieve lower rate loss compared to constant composition distribution matching for a given $n_p$. However, the output sequences have different empirical distributions that match the target distribution only on average, i.e., the ensemble average of the output sequences imitates the desired distribution. Hence, the empirical distribution of a specific sequence may deviate from the desired distribution.

Besides distribution matching algorithms, there are other methods for probability shaping with indirect signal shaping algorithms (e.g., sphere shaping and shell mapping) that opt for the most energy-efficient codewords. In contrast to distribution matching methods that target a specific pre-designed distribution in the output, the indirect methods are designed to achieve a target rate, i.e., a constant $k_p$ for a given $n_p$. For example, in shell mapping, $2^{k_p}$ codewords are chosen from all possible sequences that fulfill the energy budget, and the others are neglected. The potential codewords are on the surface or inside an $n_p$-dimensional sphere. The computational complexity of enumerative sphere shaping and shell mapping is $\mathcal{O}(n_p)$ and $\mathcal{O}(n_p^3)$, respectively. The rate loss for indirect signal shaping can be smaller than constant composition distribution matching. However, the rate loss as a function of the sequence length is not the only parameter to judge the performance of the probability shaping algorithms. In fact, constant composition distribution matching can afford a longer frame length with lower computational complexity compared to shell mapping. Therefore, it could be preferable to use constant composition distribution matching over sphere mapping for longer frame lengths, even if the constant composition distribution matching rate loss is higher for a fixed frame length. Another issue for sphere shaping and shell mapping is that they are not optimized for IM/DD optical communications. This is attributed to the fact that shell and sphere mapping are asymptotically optimal for AWGN channels with electrical power constraint (restricted signal variance). On the other hand, the input distribution for IM/DD is subject to nonnegativity and optical power constraints (restricted signal mean), and accordingly a sphere is not necessarily the optimal shape for the shell in this case.

It may be of interest also to investigate the power consumption of the disclosed SpaDCoM technique. In fact, the power dissipation can be attributed to two primary sources: (1) the communication and (2) computation power consumption. The disclosed SpaDCoM technique reduces the communication power consumption, as it can achieve the same rate compared to uniform signaling with less transmitted power (up to 2 dB). The reason is that constant composition distribution matching is asymptotically optimal from a power efficiency perspective. Nevertheless, the power dissipated in computations increases due to the additional operations required for constant composition distribution matching. The savings in the communication power increases significantly with the distance, while the computational power dissipation is distance-independent. Accordingly, the disclosed SpaDCoM technique is energy efficient for backhauling applications. However, further analysis is required to precisely judge the total power consumption, accounting for the considered hardware components, e.g., the microprocessor and power amplifier, their impact on the actual dissipated energy for each arithmetic operation, and the savings in the transmitted power.

The outage probability of the disclosed SpaDCoM technique is the probability that a given transmission rate is not achievable, because of the irradiance fluctuations. The outage probability can be written as $$P_{outage}(R) = \mathbb{P}\{R_{BMD}(g,\Delta,p) < (p)\} \tag{37}$$

where R is the transmission rate. In the disclosed SpaDCoM technique when the channel state information is available at the transmitter, the encoder 115 adapts the transmission rate according to the channel condition g. From the rate constraint (34), the rate is always achievable with symbol-metric encoders and optimal forward error correction, even with zero back-off rate. For bit-metric decoding and a practical forward error correction, an appropriate $R_{backoff}$ in (34) should be considered to achieve an acceptable error performance.

Regarding the disclosed blind SpaDCoM technique when the channel state information is known only at the receiver, there is a non-zero outage probability. In order to calculate it we start by defining the threshold for the irradiance $$g_o(R) = \{g_o \in \mathbb{R}^+ : R_{BMD}(g_o,\Delta,p) = R(p)\} \tag{38}$$

where $\mathbb{R}^+$ is the set of all positive real numbers. The achievable rate $R_{BMD}(g_o, \Delta, p)$ is non-decreasing in g. Therefore, from (37), (38), and equation 11 in Reference Document [11], the outage probability can be rewritten in closed-form as $$P_{outage}(R) = \tag{39}$$
$$\mathbb{P}\{G < g_o(r)\} = \frac{(\alpha\beta g_o(R))^{\frac{\alpha+\beta}{2}}}{\Gamma(\alpha)\Gamma(\beta)} \times G_{1,3}^{2,1}\left(\alpha\beta g_o \middle| \begin{array}{c} 1-\frac{\alpha}{\beta} \\ \frac{\alpha-\beta}{2}, \frac{\beta-\alpha}{2}, \frac{\alpha+\beta}{2} \end{array}\right)$$

where $G_{1,3}^{2,1}(\cdot|\cdot)$ is the Meijer G-function.

For the blind SpaDCoM, the encoder 115 should be designed such that the outage probability is less than a predefined $\bar{\gamma}$ threshold. In this regard, the transmission rate is calculated $\bar{\gamma}$ for a fixed irradiance $\bar{g}(\bar{\gamma})$ defined as $$\bar{g}(\bar{\gamma}) = \{\bar{g} \in \mathbb{R}^+ : \mathbb{P}\{G < \bar{g}\} = \bar{\gamma}\} \tag{40}$$

which can be found from the inverse of the turbulence fading cumulative distribution function. Finally, the transmission rate is obtained for a given P/σ by substituting g with $\bar{g}$ in the procedures discussed above. Consequently, $\bar{\gamma}$ the outage probability is bounded below as required, i.e., $P_{outage}(R_{SpaDCoM}(\bar{g})) \leq \bar{\gamma}$.

Monte Carlo simulations and numerical results are now discussed to evaluate the performance of the disclosed SpaDCoM techniques. The uniform signaling, M-PAM capacity, capacity bounds in equation (1) in Reference Document [9] and equation (3) in Reference Document [7], and coded modulation scheme in Reference Document [2] are used as benchmarks for the performance. In all numerical results, the optimal distribution for the proposed scheme is obtained according to the procedures in discussed above. The back-off rate, required input parameter for Algorithm 2, is set as $R_{backoff}=0.05$. For the channel coding, we consider the LDPC DVB-S2 with $c \in \mathbb{R}_c$, defined in above.

Figure 4:
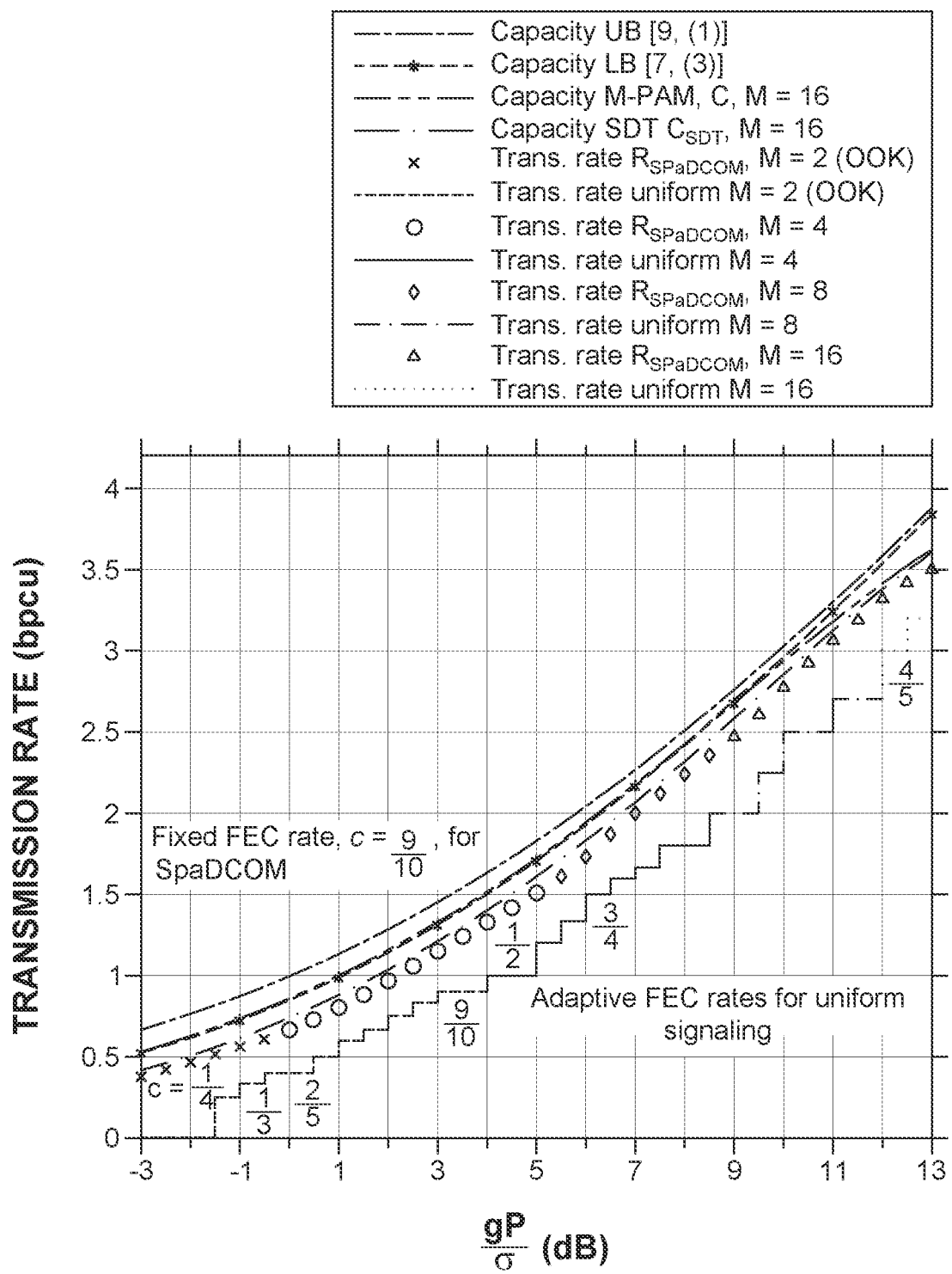
FIG. 4 illustrates the transmission rate versus signal-to-noise ratio for the disclosed transmission method according to embodiments.

FIG. 4 compares the transmission rate of the disclosed SpaDCoM technique with channel state information versus signal-to-noise ratio with the achievable rate of the uniform signaling and the capacity of 16-PAM. The modulation order M is adapted with the signal-to-noise ratio for both uniform and non-uniform signaling schemes. The 16-PAM is chosen as a benchmark, as it can be considered as an upper bound for the capacities of lower M-ary modulations. The optimal rate that maximizes the achievable rate for the SpaDCoM technique tends to use the highest forward error correction rate, i.e., c=0.9, to approach the M-PAM capacity. On the other hand, the forward error correction rate for the uniform based scheme is selected such that the transmission rate, c log(M), is less than the achievable rate with uniform signaling, $\mathbb{I}_A(u|g)$. For instance, at R=1.5, the disclosed SpaDCoM technique operates within 1.75 from the capacity upper bound, 1 dB from both the M-PAM capacity and the capacity lower bound, and within 0.3 dB from the sparse-dense transmission capacity. It also outperforms the uniform signaling with more than 1 dB for R=1.5, and up to 2.5 dB for R=0.5, where the gap increases for lower transmission rates.

Figure 5A:
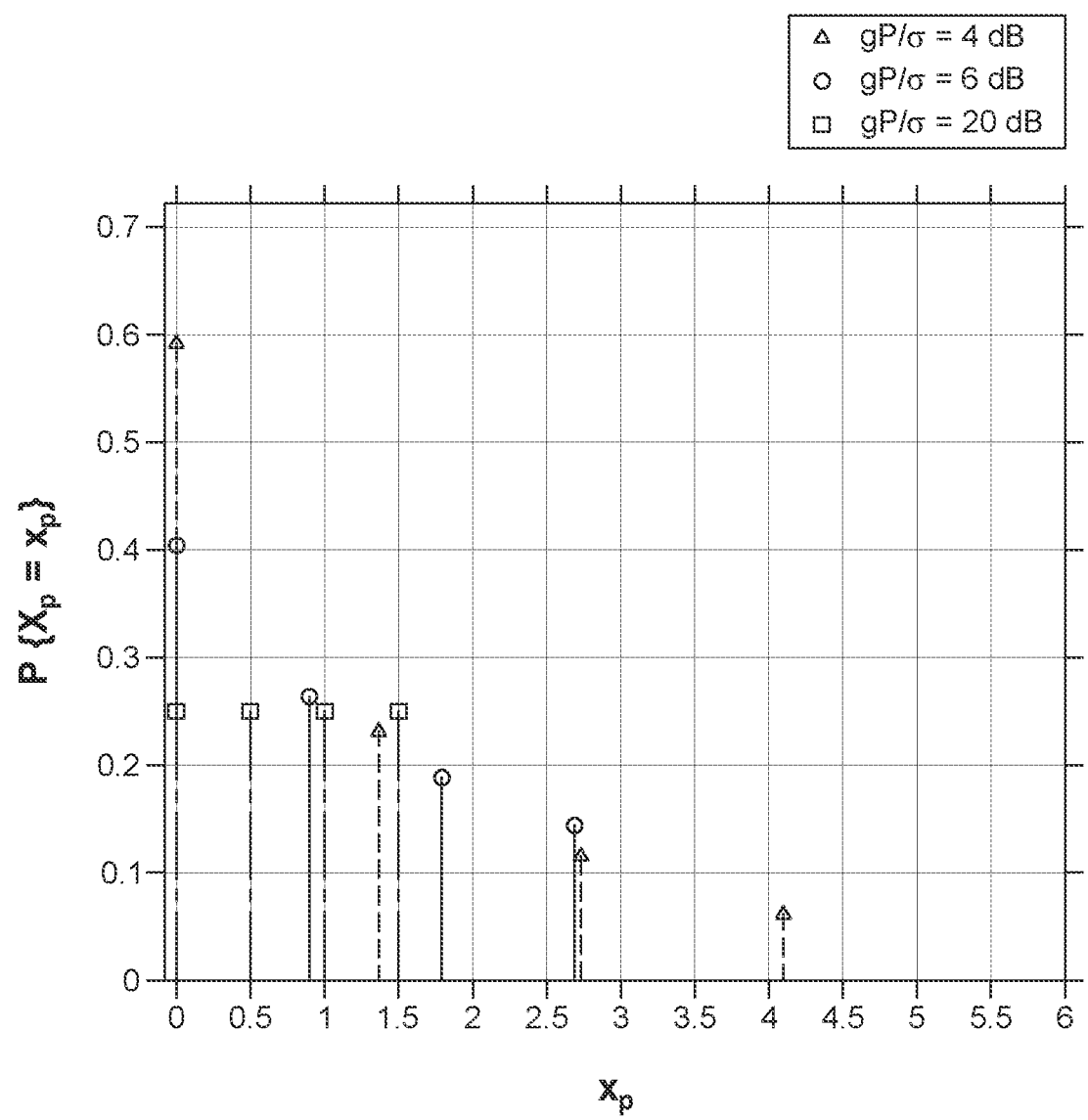
FIGS. 5A and 5B illustrate the optimal probability mass functions of the input signal for various instantaneous signal-to-noise ratios, where in FIG. 5A M=4 and in FIG. 5B M=8 according to embodiments.
Figure 5B:
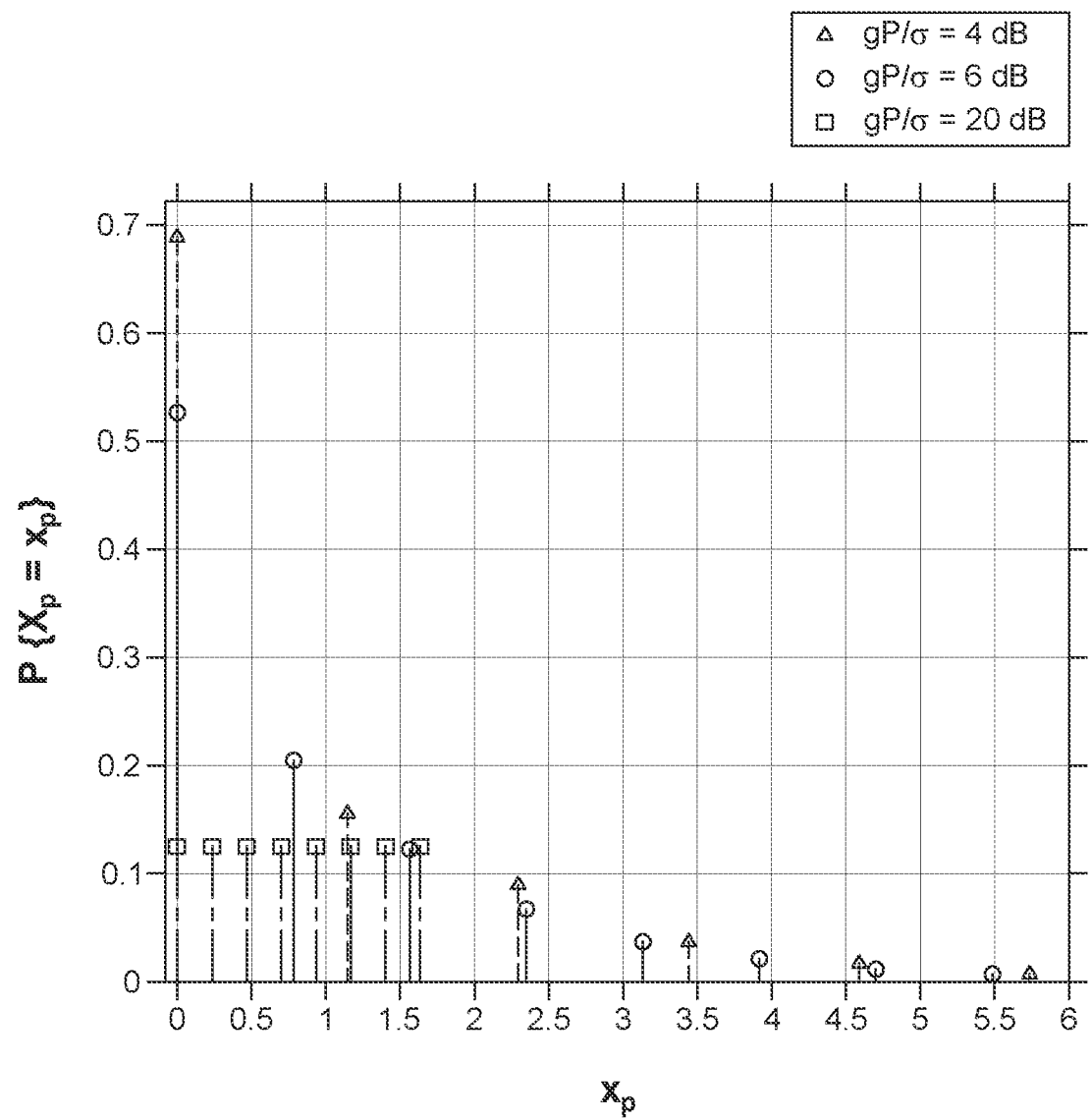

FIGS. 5A and 5B illustrate the optimal probability mass function obtained following the procedures described above for various signal-to-noise ratio and modulation orders $M \in \{4, 8\}$. It can be noticed that the symbols with low amplitudes tend to have higher probabilities than the symbols with larger amplitudes at low signal-to-noise ratios. This permits large constellation spacing Δ* without violating the average optical power constraint. For instance, the maximum value of Δ in OOK increases with the probability of the zero symbol, i.e., $\Delta \leq P/(1-p_0)$. For high instantaneous signal-to-noise ratios and a fixed M, the distribution is almost uniform and the distance between the symbols is small, which is attributed to the fact that for asymptotically high signal-to-noise ratios the mutual information approaches the source entropy that is maximized using equiprobable symbols. It should be noted that the disclosed adaptive SpaDCoM technique should increase the modulation order M to achieve higher rates at higher signal-to-noise ratios.

Figure 6:
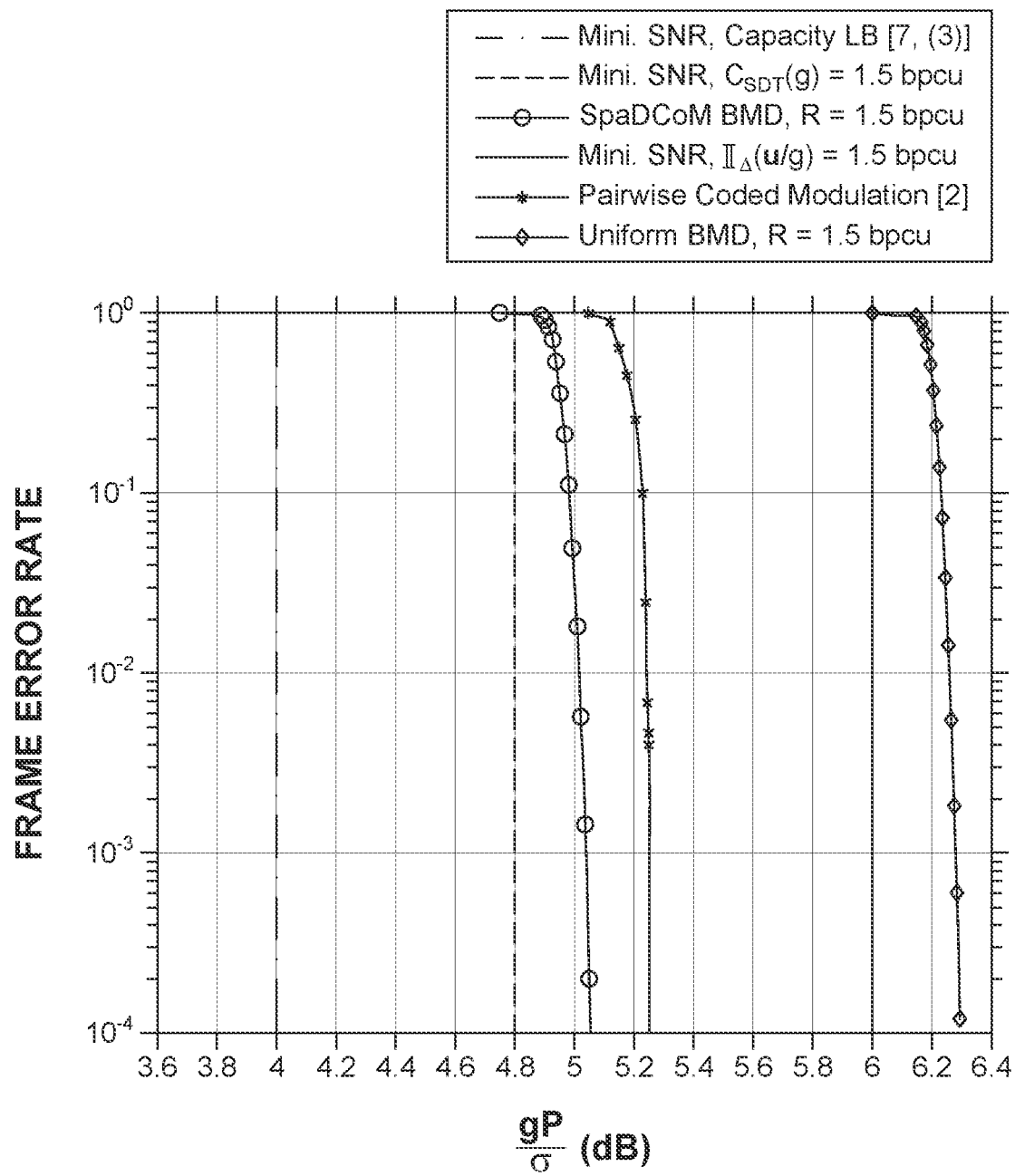
FIG. 6 illustrates the frame error rate versus signal-to-noise ratio for the disclosed transmission method, uniform signaling, and pairwise composition matching according to embodiments, for a fixed transmission rate of 1.5 bits per channel use.

FIG. 6 illustrates, the performance of the disclosed SpaDCoM technique compared with both uniform signaling and pairwise coded modulation [23], in terms of the frame error rate (FER) using Monte Carlo simulation. The transmission rates of the schemes are kept constant at 1.5 bpcu. The minimum signal-to-noise ratio that permits transmission at this rate can be found from FIG. 3a for the capacity lower bound from equation (3) in Reference Document [7], sparse-dense transmission, and uniform based scheme as 4 dB, 4.8 dB, and 6 dB, respectively. For SpaDCoM, the minimum SNR that is required for an achievable rate of 1.5 bpcu is 5 dB, as shown in FIG. 4. The optimal symbol probabilities, constellation spacing, and forward error correction rate are p*=[0.53, 0.25, 0.14, 0.08], 0*=1.18, and c=9/10, respectively. These parameters are obtained using the procedures discussed above with $R_{backoff}=0.05$ in Algorithm 2. The corresponding values for uniform signaling are p=[¼, ¼, ¼, ¼], $$\Delta_u \triangleq 2P/(M-1),$$

and c=¾, respectively.

As an additional benchmark, the performance of the coded modulation scheme in Reference Document [2] is shown. The forward error correction rate and the pairwise distribution, i.e., two consecutive symbols have the same probability, are adjusted to yield the target rate and power. In particular, the pairwise probability mass function is set as [0.405, 0.405, 0.095, 0.095] with 1.14 constellation spacing, while c=0.9. The LDPC code adopted for DVB-S2 is considered for all the schemes with word length 64800. For the decoding of the disclosed SpaDCoM technique, the LLR is computed from (20) assuming perfect estimation of the channel gain g. It can be seen that the frame error rate (FER) exhibits a phase transition phenomenon around the signal-to-noise ratio, which is associated with the transmission rate. Also, the disclosed SpaDCoM technique achieves about 1.3 dB and 0.25 dB reduction in transmitted power compared to uniform and pairwise signaling, respectively, for $FER=10^{-3}$ and R=1.5.

Figure 7A:
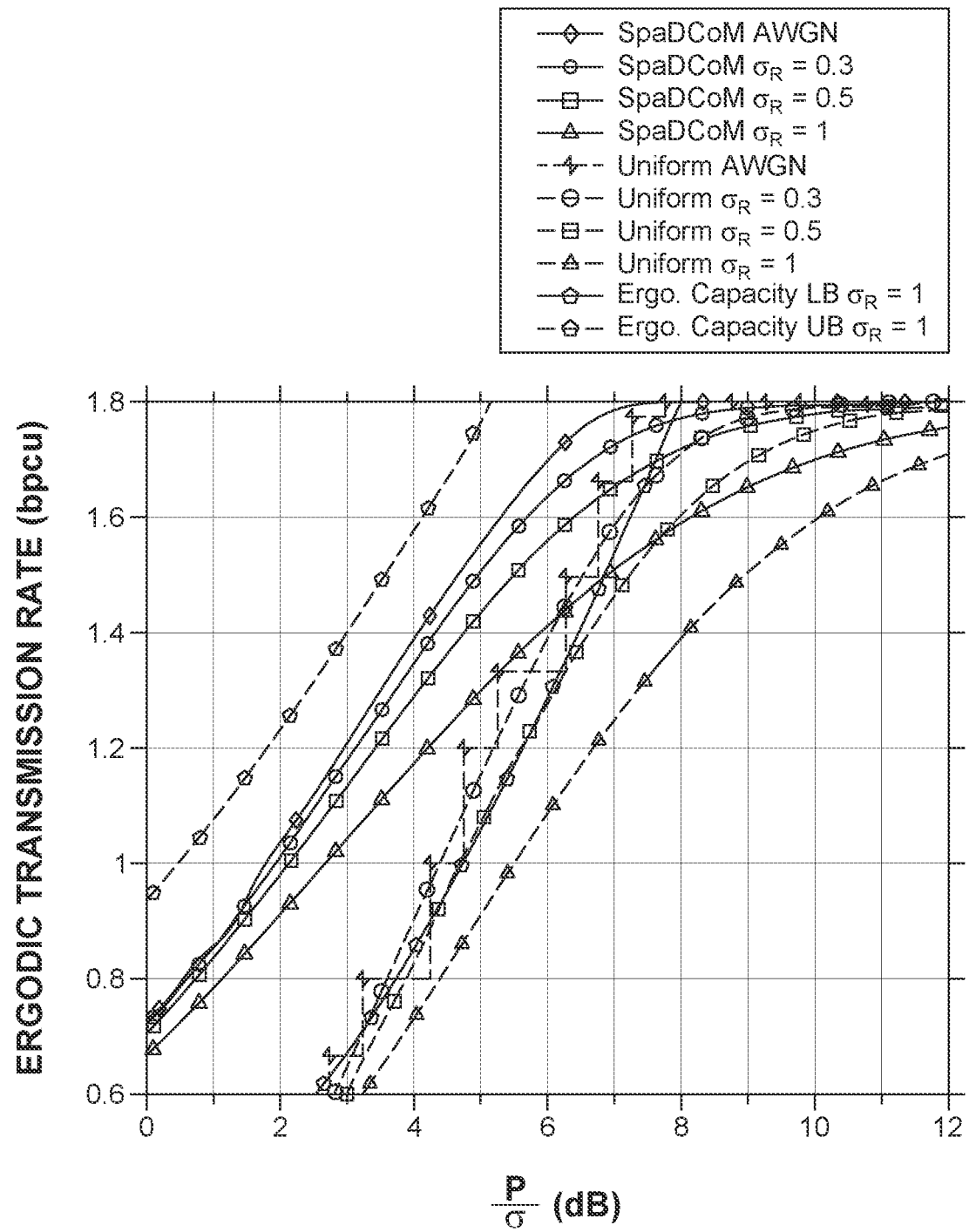
FIGS. 7A and 7B illustrate the ergodic rate of the disclosed transmission method with channel state information versus P/σ for M=4 and various turbulence conditions in terms of the Rytov variance, where in FIG. 7A the irradiance fluctuations are modeled by gamma-gamma distribution and in FIG. 7B the irradiance fluctuations are modeled by a lognormal distribution according to embodiments.
Figure 7B:
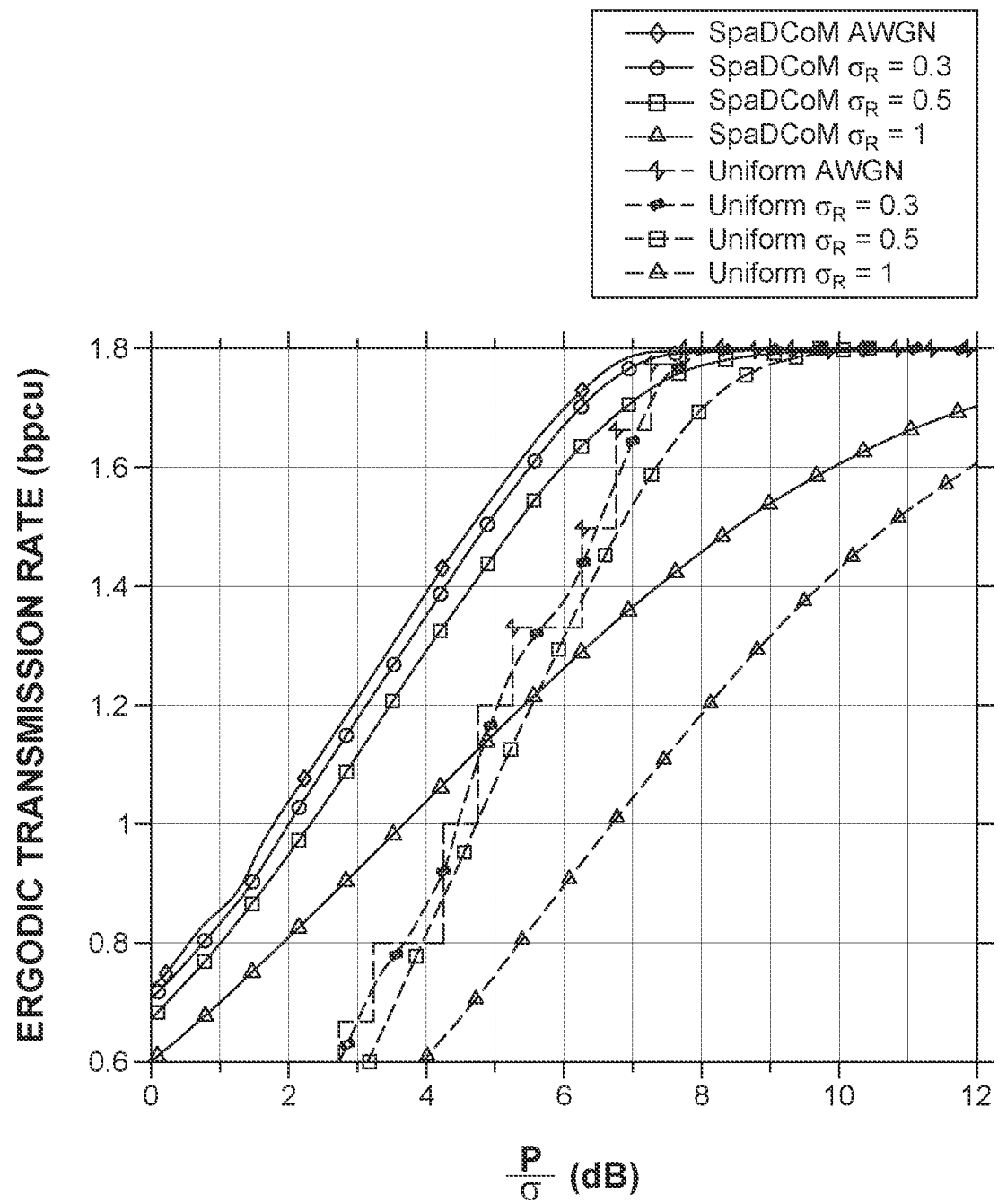

The ergodic rates of the SpaDCoM channel-state-information-aware scheme, (36), and the uniform approach are depicted in FIGS. 7a and 7b with M=4, for various turbulence conditions in terms of the Rytov variance.

As a benchmark, we calculate the ergodic upper and lower bounds on the capacity are calculated from the bounds in Reference Document [8]. For comparison, the lognormal model for the atmospheric turbulence-induced fading in equation (34) of Reference Document [12] is considered. The disclosed SpaDCoM technique achieves better ergodic performance compared to the uniform signaling based method, e.g., 2.5 dB at R=0.56. It can be seen that as the turbulence increases (i.e., the Rytov variance $\sigma_R^2$), the ergodic rate decreases. Also, for small turbulence with $\sigma_R=0.1$, the ergodic rate approaches the transmission rate for AWGN channels, while the gap between the rate and the ergodic upper bound of the capacity in Reference Document [8] is about 2 dB at R=1.2 bpcu.

Figure 8:
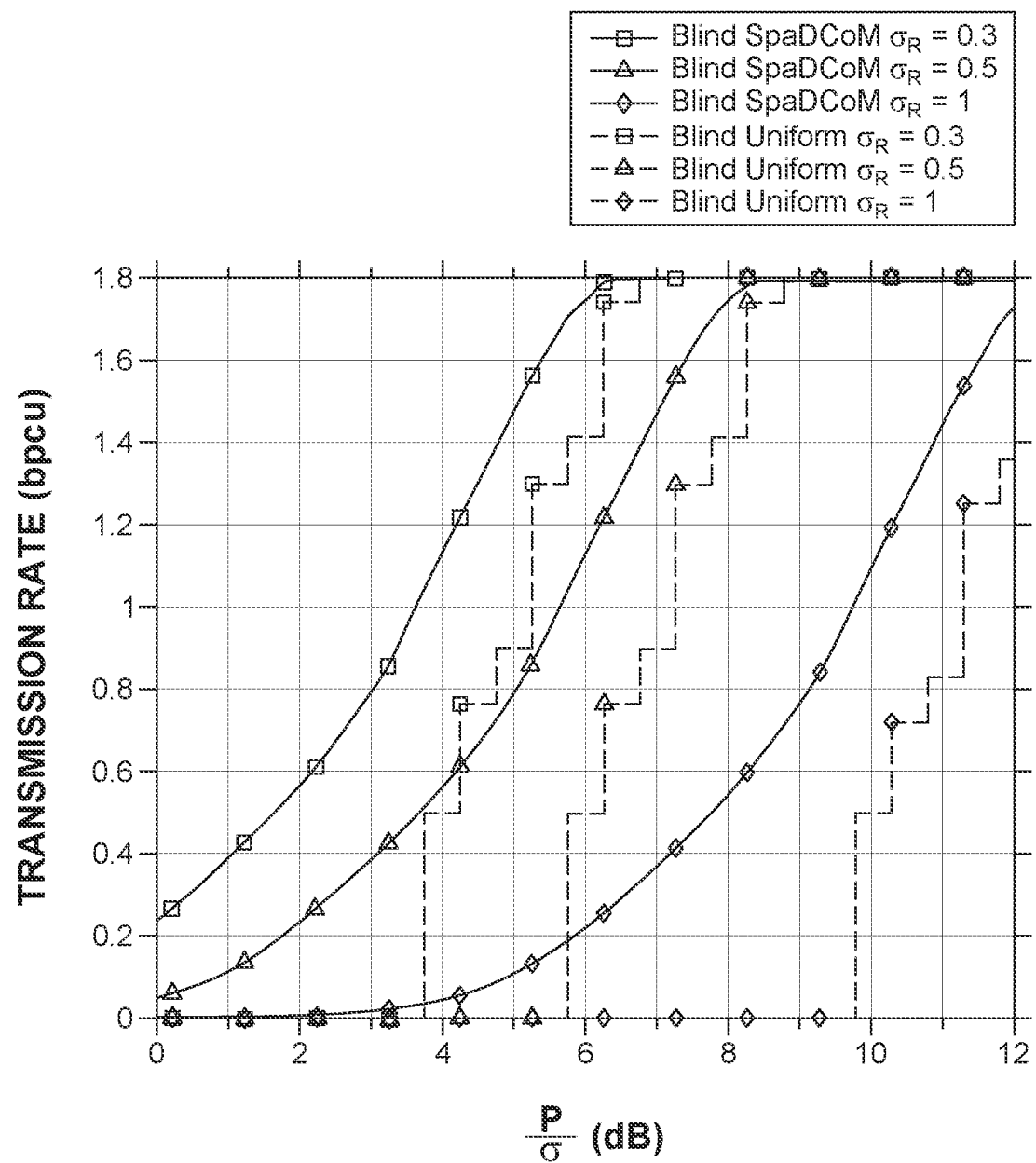
FIG. 8 illustrates the transmission rate for the disclosed transmission method without channel state information versus signal-to-noise ratio with outage probability $P_{outage} \leq 10^{-4}$ and M=4 according to embodiments.

Finally, the performance of the blind SpaDCoM technique when channel state information is known only at the decoder 125 is illustrated in FIG. 8. The transmission rate of the disclosed SpaDCoM technique versus P/σ is compared with the uniform signaling for different turbulence conditions with Gamma-Gamma distributed turbulence. The design criteria is according to the discussion above with upper bounded outage probability such that $P_{outage} \leq \bar{\gamma} = 10^{-4}$. For the disclosed SpaDCoM technique, the transmission rate is set as c=0.9. The forward error correction rate for uniform signaling is chosen such that the transmission rate, c log(M), is less than the achievable rate $\bar{\gamma}$ with uniform signaling, $R_{BMD}(\bar{g}(\bar{\gamma}), \Delta_u, u)$. The SpaDCoM encoder 115 is superior to the uniform method with about 2 dB for R=0.5 bpcu, and with 1 dB for R=1.5 and $\sigma_R=0.5$.

The discussion above discloses a coded modulation scheme for free-space optical based backhaul applications. The encoder 115 is adaptive to the atmospheric turbulence-induced fading with arbitrary fine granularity. In particular, the signal constellation is probabilistically shaped by a low complexity fixed-to-fixed length distribution matcher to approach the capacity of free-space optical channels with IM/DD. The disclosed SpaDCoM technique can employ any efficient off-the-shelf forward error correction encoder, and it can also operate when the channel state information is known only at the receiver. The disclosed SpaDCoM technique approaches the capacity of unipolar M-PAM. Moreover, it outperforms the uniform signaling based encoders. For instance, the probabilistic based scheme can achieve a reduction in the transmitted power up to 2 dB compared to the uniform signaling at an ergodic rate of 0.5 bpcu.

It should be recognized that the disclosed SpaDCoM technique can be performed by a processor that loads programming instructions from a non-transitory computer-readable medium, such as a memory.

The disclosed embodiments provide systems and methods for communication over a free-space optical channel using constant composition distribution matching. It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCED DOCUMENTS

[1] A. Farid and S. Hranilovic, "Channel capacity and non-uniform signalling for free-space optical intensity channels," IEEE J. Sel. Areas Commun., vol. 27, no. 9, pp. 1553-1563, December 2009.

[2] Z. He, T. Bo, and H. Kim, "Probabilistically shaped coded modulation for IM/DD system," Opt. Express, vol. 27, no. 9, pp. 12 126-12 136, Apr. 2019.

[3] P. Schulte and G. Böcherer, "Constant composition distribution matching," IEEE Trans. Inf. Theory, vol. 62, no. 1, pp. 430-434, January 2016.

[4] R. L. P. Ammar Al-Habash, Larry C. Andrews, "Mathematical model for the irradiance probability density function of a laser beam propagating through turbulent media," Optical Engineering, vol. 40, no. 8, pp. 1554-1562-9 Aug. 2001.

[5] G. BOcherer, F. Steiner, and P. Schulte, "Bandwidth efficient and rate-matched low-density parity-check coded modulation," IEEE Trans. Commun., vol. 63, no. 12, pp. 4651-4665, December 2015.

[6] J. Cho and P. J. Winzer, "Probabilistic constellation shaping for optical fiber communications," J. of Lightwave Technology, vol. 37, no. 6, pp. 1590-1607, March 2019.

[7] A. Farid and S. Hranilovic, "Capacity bounds for wireless optical intensity channels with Gaussian noise," IEEE Trans. Inf. Theory, vol. 56, no. 12, pp. 6066-6077, December 2010.

[8] A. Lapidoth, S. M. Moser, and M. A. Wigger, "On the capacity of free-space optical intensity channels," IEEE Trans. Inf. Theory, vol. 55, no. 10, pp. 4449-4461, 2009.

[9] A. Chaaban, J. Morvan, and M.-S. Alouini, "Free-space optical communications: Capacity bounds, approximations, and a new sphere-packing perspective," IEEE Trans. Commun., vol. 64, no. 3, pp. 1176-1191, March 2016.

[10] T. Lipp and S. Boyd, "Variations and extension of the convex-concave procedure," Optimization and Engineering, vol. 17, no. 2, pp. 263-287, June 2016.

[11] Nistazakis, T. Tsiftsis, and G. Tombras, "Performance analysis of free-space optical communication systems over atmospheric turbulence channels," IET comm., vol. 3, no. 8, pp. 1402-1409, 2009.

[12] L. C. Andrews, R. L. Phillips, and C. Y. Hopen, Laser Beam Scintillation with Applications. Bellingham, Wash. 98227-0010 USA: SP IE—The International Society for Optical Engineering, 2001.

What is claimed is:

1. A method for optical communication between first and second transceivers (100) over a channel in a free-space medium, the method comprising:
receiving (202), by the first transceiver (100), a binary string of uniformly distributed bits (u);
converting (204), by the first transceiver (100), the received binary string of uniformly distributed bits (u) into probabilistically-shaped unipolar M-pulse amplitude modulated, M-PAM, symbols ($x_p$) using distribution matching;
mapping (206), by the first transceiver (100), the probabilistically-shaped unipolar M-PAM symbols ($x_p$) into a binary bit stream ($z_p$);
generating (208), by the first transceiver (100) at a forward error correction rate, parity bits ($z_u$) from the binary bit stream ($z_p$);
mapping (210), by the first transceiver (100), the parity bits ($z_u$) to uniformly-distributed unipolar M-PAM parity symbols ($x_u$);
multiplexing (212), by the first transceiver (100), the probabilistically-shaped unipolar M-PAM symbols and the uniformly-distributed unipolar M-PAM parity symbols to form a codeword (x); and
transmitting (216), by the first transceiver (100), the codeword (x) over the channel to the second transceiver by modulating an intensity of a laser with the codeword (x).

2. The method of claim 1, further comprising:
receiving and demodulating, by the second transceiver, the transmission from the first transceiver;
estimating, by the second transceiver, the channel;
forward error correction decoding, by the second transceiver, the transmission using the estimate of the channel to generate a set of bits corresponding to the binary bit stream;

demapping, by the second transceiver, the set of bits into demapped unipolar M-PAM symbols;

distribution dematching, by the second transceiver, the demapped unipolar M-PAM symbols to generate a set of received information bits.

3. The method of claim 2, wherein the conversion by the first transceiver using distribution matching uses constant composition distribution matching.

4. The method of claim 2, wherein the conversion by the first transceiver and the demapping by the second transceiver are performed using arithmetic coding.

5. The method of claim 2, wherein the forward error correction decoding uses the channel estimation for soft-decision decoding of the transmission.

6. The method of claim 2, further comprising:
determining, by the first transceiver, a capacity-achieving distribution of symbols for transmission over the channel, a data transmission rate, and the forward error correction rate, wherein the first transceiver converts the received binary string of uniformly distributed bits into the probabilistically-shaped unipolar M-PAM symbols using the constant composition distribution matching based on the determined capacity-achieving distribution of symbols and the data transmission rate.

7. The method of claim 6, wherein the determination of the capacity-achieving distribution of symbols for transmission over the channel, the data transmission rate, and the forward error correction rate are based on channel state information provided by the receiver.

8. The method of claim 7, wherein the distribution the determination of the capacity-achieving distribution of symbols for transmission over the channel, the data transmission rate, and the forward error correction rate based on channel state information provided by the receiver comprises:
optimizing a probability of the symbols, spacing between symbols, and the forward error correction rate subject to a transmit rate constraint and a power constraint by selecting a forward error correction rate to satisfy the transmit rate constraint, and then applying a difference of a convex relation method for an objective function and the power constraint.

9. The method of claim 7, wherein the distribution the determination of the capacity-achieving distribution of symbols for transmission over the channel, the data transmission rate, and the forward error correction rate based on channel state information provided by the receiver comprises:
optimizing a probability of the symbols and spacing between symbols subject to a transmit rate constraint and a power constraint by selecting a forward error correction rate to satisfy the transmit rate and power constraints, and then applying a difference of a convex relation method for the transmit rate constraint.

10. A receiver (100B) that receives an optical signal modulated with the codeword from the transmitter of claim 9, the receiver comprising:
an optical demodulator (116) that receives and demodulates the optical signal;
a channel estimator (118) that estimates the channel;
bit-metric decoder (120) coupled to receive the demodulated signal from the optical demodulator (116) and the estimate of the channel from the channel estimator (118), wherein the bit-metric decoder (120) decodes the demodulated signal using the estimate of the channel to generate a set of bits corresponding to the binary bit stream;
a binary demapper (122) coupled to an output of the bit-metric decoder (120), wherein the binary demapper (122) demaps the set of bits into demapped unipolar M-PAM symbols; and
a distribution dematcher (124) coupled to an output of the binary demapper (122), wherein the distribution dematcher (124) distribution dematches the demapped unipolar M-PAM symbols to generate a set of received information bits.

11. The receiver of claim 10, wherein the distribution dematcher dematches the demapped unipolar M-PAM symbols using a look-up table.

12. The receiver of claim 10, wherein the distribution dematcher dematches the demapped unipolar M-PAM symbols using arithmetic coding.

13. The method of claim 6, wherein the determination of the capacity-achieving distribution of symbols for transmission over the channel, the data transmission rate, and the forward error correction rate is based on a fixed channel gain.

14. A transmitter (100A) for optical communication over a channel in a free-space medium, the transmitter comprising:
a distribution matcher (102), which converts a received binary string of uniformly distributed bits (u) into probabilistically-shaped unipolar M-pulse amplitude modulated, M-PAM, symbols ($x_p$) using distribution matching;
a binary mapper (104) coupled to an output of the distribution matcher (102), wherein the binary mapper (104) maps the probabilistically-shaped unipolar M-PAM symbols ($x_p$) into a binary bit stream ($z_p$);
a parity bit generator (106) coupled to an output of the binary mapper (104), wherein the parity bit generator (106) generates uniformly-distributed parity bits ($z_u$) from the binary bit stream ($z_p$) at a forward error correction rate;
a binary demapper (108) coupled to an output of the parity bit generator (106), wherein the binary demapper (108) maps the uniformly distributed parity bits ($z_u$) to uniformly-distributed unipolar M-PAM parity symbols ($x_u$);
a multiplexer (110) coupled to the output of the distribution matcher (102) and an output of the binary demapper (108), wherein the multiplexer (110) multiplexes the probabilistically-shaped unipolar M-PAM symbols and the uniformly-distributed unipolar M-PAM parity symbols to form a codeword (x); and
an optical modulator (112) coupled to an output of the multiplexer (110), wherein the optical modulator modulates an intensity of a laser with the codeword (x).

15. The transmitter of claim 14, wherein the distribution matcher is a constant composition distribution matcher, and wherein the constant composition distribution matcher converts the received binary string of uniformly distributed bits using arithmetic coding.

16. The transmitter of claim 15, further comprising:
a distribution optimizer having an output coupled to an input of the constant composition distribution matcher, wherein the distribution optimizer determines a capacity-achieving distribution of symbols for transmission over the channel, a data transmission rate, and the forward error correction rate, wherein the constant composition distribution matcher converts the received binary string of uniformly distributed bits into the probabilistically-shaped unipolar M-PAM symbols using the constant composition distribution matching based on the determined capacity-achieving distribution of symbols and the data transmission rate.

17. The transmitter of claim 15, wherein
the distribution optimizer includes an input to receive channel state information from a receiver, or
the distribution optimizer determines a capacity-achieving distribution of symbols for transmission over the channel, the forward error correction rate, and consequently a data transmission rate based on a fixed channel gain.

18. A transmitter for optical communication over a channel in a free-space medium, the transmitter comprising:
a memory storing programming instructions; and
a processor coupled to the memory, wherein execution of the programming instructions by the processor causes the processor to
receive a binary string of uniformly distributed bits (u);
convert the received binary string of uniformly distributed bits (u) into probabilistically-shaped unipolar M-pulse amplitude modulated, M-PAM, symbols ($x_p$) using distribution matching;
map the probabilistically-shaped unipolar M-PAM symbols ($x_p$) into a binary bit stream ($z_p$);
generate parity bits ($z_u$) from the binary bit stream ($z_p$) at a forward error correction rate;
map the parity bits ($z_u$) to uniformly-distributed unipolar M-PAM parity symbols ($x_u$);
multiplex the probabilistically-shaped unipolar M-PAM symbols and the uniformly-distributed unipolar M-PAM parity symbols to form a codeword (x); and
transmit the codeword (x) over the channel to the second transceiver by modulating an intensity of a laser with the codeword (x).

19. The transmitter of claim 18, wherein the processor converts the received binary string of uniformly distributed bits using constant composition distribution matching.

20. The transmitter of claim 19, wherein the execution of the programming instructions by the processor, further causes the processor to
determine a capacity-achieving distribution of symbols for transmission over the channel, a data transmission rate, and the forward error correction rate, wherein the first transceiver converts the received binary string of uniformly distributed bits into the probabilistically-shaped unipolar M-PAM symbols using the constant composition distribution matching based on the determined capacity-achieving distribution of symbols and the data transmission rate.

* * * * *